United States Patent [19]

Takeda et al.

[11] Patent Number: 4,640,673
[45] Date of Patent: Feb. 3, 1987

[54] COMPRESSION MOLDING APPARATUS

[75] Inventors: Hiroshi Takeda; Noritsugu Oshima, both of Kanagawa; Tateo Kubo, Hiratsuka; Kenichi Sakaguchi, Kawasaki, all of Japan

[73] Assignee: Toyo Seikan Kaisha, Ltd., Tokyo, Japan

[21] Appl. No.: 730,534

[22] Filed: May 3, 1985

[30] Foreign Application Priority Data

May 22, 1984 [JP] Japan .................. 59-101776

[51] Int. Cl.$^4$ ................ B29C 43/08; B29C 45/06
[52] U.S. Cl. ................ 425/297; 425/345; 425/348 R; 425/361; 425/408; 425/576
[58] Field of Search ............ 425/348 R, 809, 346, 425/347, 296, 324.1, 327, 233, 234, 348 S, 345, 408, 361, 526, 259, 297; 249/59

[56] References Cited

U.S. PATENT DOCUMENTS

| | | | |
|---|---|---|---|
| 2,891,281 | 6/1959 | Heingelman | 425/348 |
| 4,060,053 | 11/1977 | Ohmi | 118/215 |
| 4,260,356 | 4/1981 | Fujiwara et al. | 425/311 |
| 4,497,765 | 2/1985 | Wilde et al. | 425/809 X |

FOREIGN PATENT DOCUMENTS 0091653 10/1983 European Pat. Off. ........ 425/348 R

Primary Examiner—Willard E. Hoag
Attorney, Agent, or Firm—Beveridge, DeGrandi & Weilacher

[57] ABSTRACT

A compression molding apparatus comprising a rotary compression molding means, a material feed means and an article carrying means. The rotary compression molding means includes a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of upper die assembly and lower die assembly being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening and closing means for moving at least one of said upper and lower die assemblies in a predetermined manner with respect to the other according to the movement of the molding die means.

31 Claims, 34 Drawing Figures

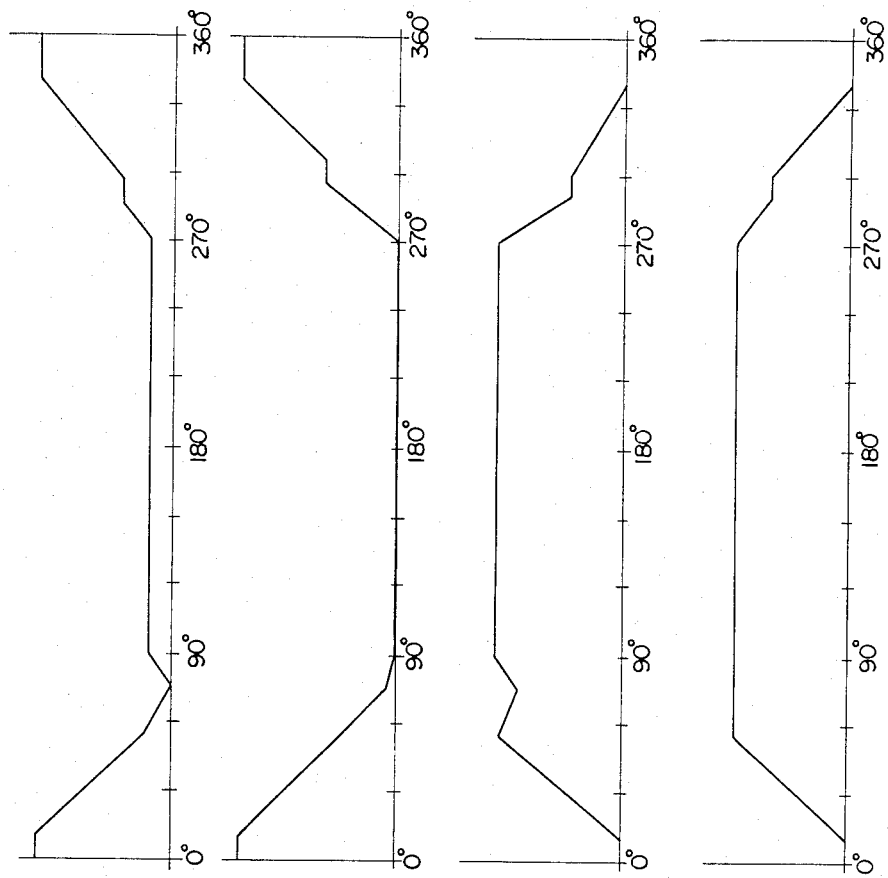

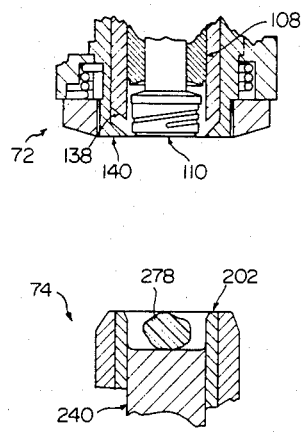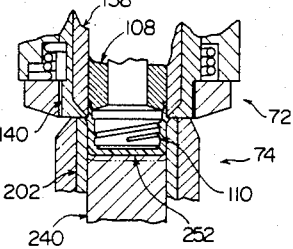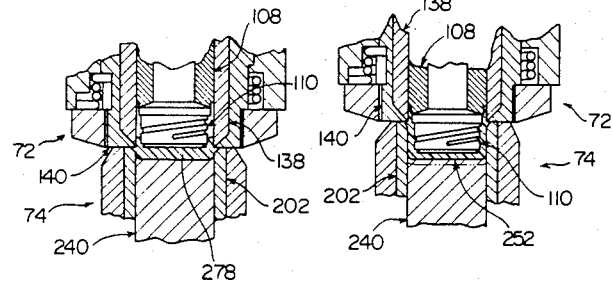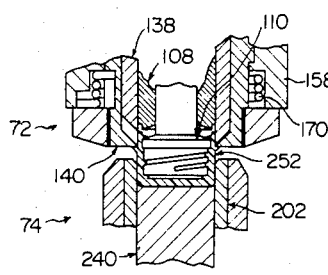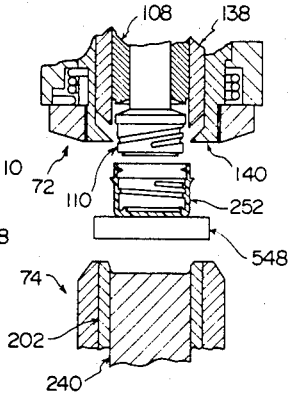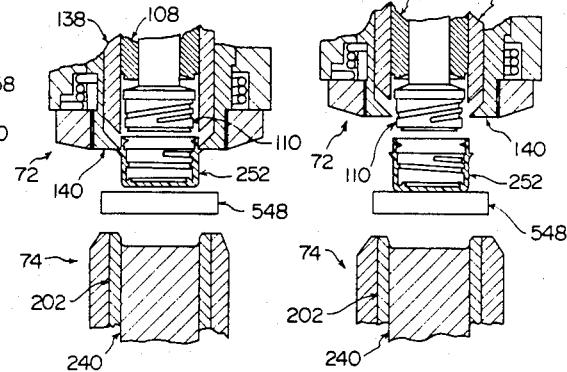

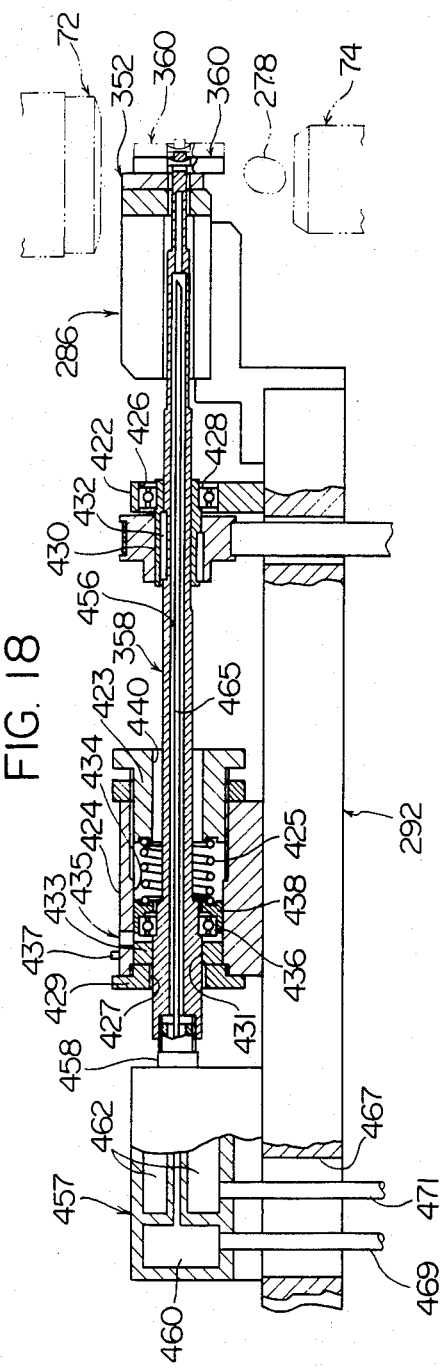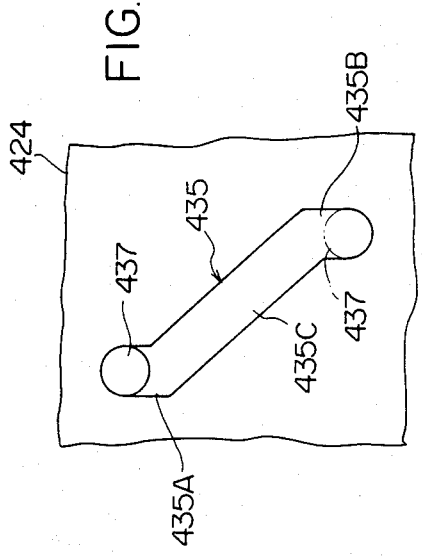

COMPRESSION MOLDING APPARATUS

BACKGROUND OF THE INVENTION

1. Field of the Invention

This invention relates to a compression molding apparatus, and more specifically, it relates, although not exclusively, to a compression molding apparatus suitable for producing container closures or the like at high speeds with a high efficiency.

2. Description of the Prior Art

As is well known to those skilled in the art, metallic container closures have recently tended to be superseded by plastic closures of various forms. Generally, the plastic closures are produced by injection or compression molding techniques. To obtain industrial and commercial success, it is important to mold the plastic closures in high quality and at high speeds and low costs sufficient to cope with the quality of the metallic closures and the speed and cost of metallic closure molding.

However, conventional molding apparatuses cannot meet the above requirements, and have made it impossible to produce plastic container closures having sufficient marketability to cope with the metallic closures.

SUMMARY OF THE INVENTION

It is a primary object of this invention to provide a compression molding apparatus which can produce plastic articles such as container closures or the like of high quality at sufficiently high speeds and low costs.

Other objects of this invention along with its advantages will become apparent from the following description taken in conjunction with the accompanying drawings showing preferred embodiments of the compression molding apparatus of this invention.

According to this invention, there is provided a compression molding apparatus comprising a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assembly and lower die assembly being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;

a material feed means for feeding a plastic material to said molding die means in said material charging means; and an article carrying means for carrying the molded article from the molding die means in said article discharging zone.

In preferred embodiments of this invention, various improvements are made in the material feed means, the molding die means in the rotary compression molding means, and the article carrying means.

BRIEF DESCRIPTION OF THE DRAWINGS

FIGS. 7-A, 7-B, 7-C and 7-D are cam diagrams showing the ascending and descending movements of an outside supporting member and an inside supporting member in the upper die assembly shown in FIG. 3 and of an outside supporting member and an inside supporting member in the lower die assembly shown in FIG. 5;

FIGS. 8-A to 8-F are each a partial sectional view showing the action of a molding die means in the rotary compression molding means shown in FIG. 2;

FIG. 18 is a sectional view showing a cutting means and its related structure in the material feed means shown in FIG. 9;

FIG. 19 is a simplified partial view showing a projecting pin in a movable member and a guide slot therefor in a shaft moving means in the cutting means shown in FIG. 18;

DETAILED DESCRIPTION OF PREFERRED EMBODIMENTS

Preferred embodiments of the compression molding apparatus constructed in accordance with this invention will be described in detail with reference to the accompanying drawings.

General Structure

Figure 1:
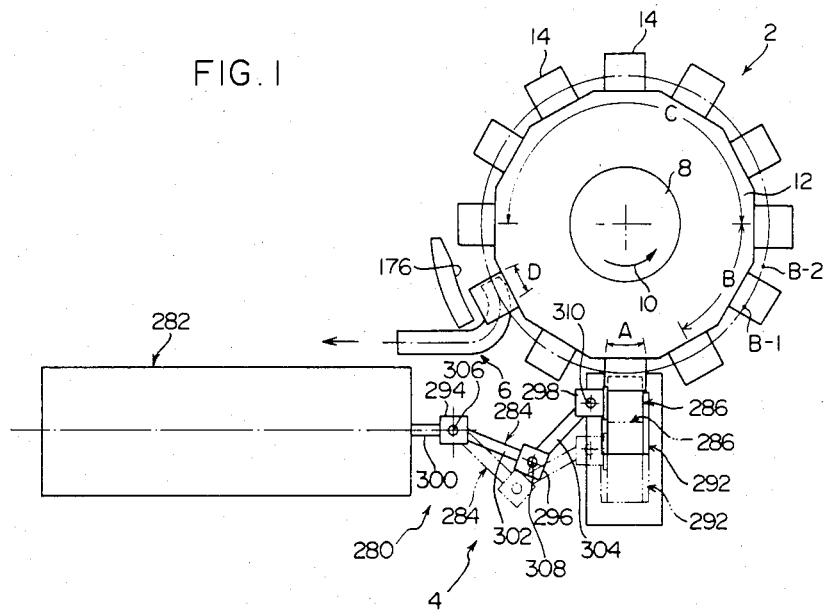
FIG. 1 is a simplified top plan view showing one specific embodiment of the compression molding apparatus constructed in accordance with this invention.

With reference to FIG. 1, the illustrated compression molding apparatus is provided with a rotary compression molding means shown generally at 2, a material feed means shown generally at 4 and an article carrying means shown generally at 6.

The rotary compression molding means 2 has a rotating supporting member 12 adapted to be rotated at a predetermined speed in the direction of an arrow 10 about a substantially perpendicularly extending central axis 8 (the axis 8 extends substantially perpendicularly to the sheet surface in FIG. 1). A plurality of (12 in the drawing) molding die means 14 are mounted on the rotating supporting member 12 at circumferentially equally spaced positions. As will be stated in detail hereinafter, each of the molding die means 14 is comprised of an upper die assembly and a lower die assembly, and is opened or closed as required while being moved through a circular conveying passage incident to the rotation of the rotating supporting member 12.

In the illustrated embodiment, a plastic material is fed into the molding die means 14 in the open state from the material feed means 4 while it is located in a material charging zone shown by A. Then, while the molding die means 14 is passing through a molding zone shown by B, it is gradually closed, and consequently, the plastic material is compression-molded into an article of the desired shape. While the molding die means 14 is passing through a cooling zone shown by C, it is maintained closed and the compression-molded article is cooled. While the molding die means 14 moves from the downstream end of the cooling zone C toward an article discharging zone shown by D, it is gradually opened, and in the article discharging zone D, the article separated from the molding die means 14 is carried away from the compression molding means 2 by the article carrying means 6.

The individual constituent elements of the compression molding apparatus generally described above will be described below in detail.

Rotary compression molding means

Figure 2:
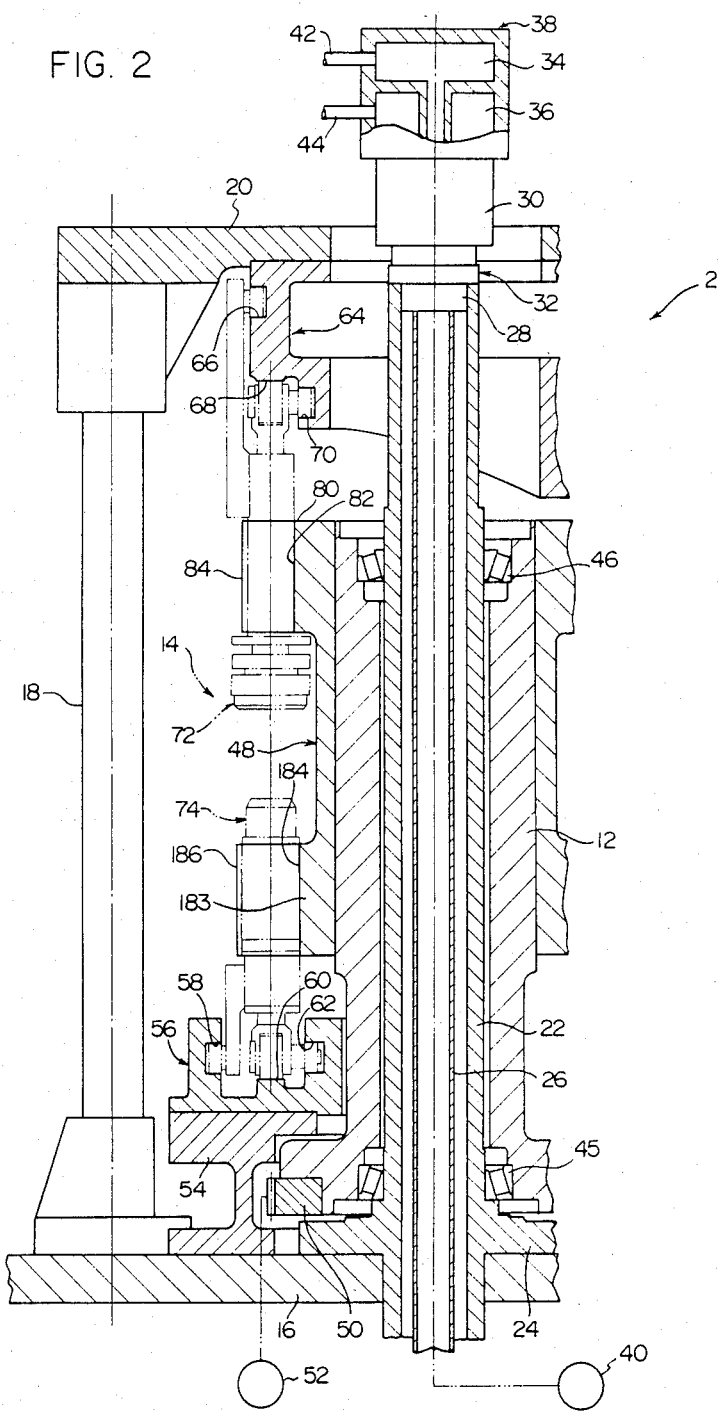
FIG. 2 is a partial sectional view showing a rotary compression molding means in the compression molding apparatus shown in FIG. 1.

The rotary compression molding means 2 will be described with reference to FIG. 2. The illustrated rotary compression molding means 2 has a substantially horizontal stationary lower base plate 16 supported at a predetermined position by a suitable supporting structure (not shown). A plurality of (only one of which is shown in FIG. 2) supporting posts 18 are provided on the peripheral edge portion of the lower base plate 16 at circumferentially spaced positions. A substantially horizontal stationary upper base plate 20 is fixed to the upper ends of these supporting posts 18.

A substantially vertically extending, nearly cylindrical stationary hollow supporting post 22 is disposed centrally in the lower base plate 16. The hollow supporting post 22 has a flange 24 at its lower part, and by fixing the flange 24 to the surface of the lower base plate 16, the hollow supporting post 22 is fixedly secured to the lower base plate 16. That part of the hollow supporting post 22 which is below the flange 24 extends downwardly through an opening formed in the lower base plate 16. A stationary tube 26 of a relatively small diameter is provided concentrically within the hollow supporting post 22, and the lower end portion of the tube 26 is supported by a suitable supporting structure (not shown). A hollow rotating joint 32 known per se and comprised of a stationary portion 28 and a rotating portion 30 supported rotatably on the stationary portion 28 is mounted on the upper end of the hollow supporting post 22. A receptacle 38 having two chambers 34 and 36 is fixed to the hollow rotating joint 32. The tube 26 extends through the hollow rotating joint 32 and communicates with the chamber 34 of the receptable 38, and the lower end of the tube 26 is connected to a supply source 40 for supplying a cooling medium which may be ordinary water. The cooling medium supplied from the supply source 40 is sent to the chamber 34 of the receptacle 38 through the tube 26 and then to the molding die means 14 through a plurality of tubes 42 (only one of which is shown in FIG. 2) of the molding die means 14 to be described in detail hereinbelow. Streams of the cooling medium which have been allowed to flow through the individual molding die means 14 are caused to flow into the chamber 36 of the receptacle 38 through a plurality of tubes (only one of which is shown in FIG. 2) extending from the molding die means 14 to the chamber 36. Then, the cooling medium comes into the hollow supporting post 22, or more specifically, into an annular space existing outwardly of the tube 26 and flows downwardly, and is then discharged through a discharge pipe line (not shown) connected to the lower end portion of the hollow supporting post 22.

The rotating supporting member 12 is rotatably mounted on the outside of the hollow supporting post 22 by means of a lower bearing 45 and an upper bearing 46. The main part of the rotating supporting member 12 has a regular dodecagonal outer shape (see FIG. 1), and a mounting block 48 for the molding die means is fixed to each of the twelve substantially vertically extending, substantially flat surfaces of the supporting member 12. Each molding means 14 to be described in greater detail hereinbelow is mounted on the mounting block 48. An input gear 50 is fixed to the periphery of the lower end of the rotating supporting member 12, and drivingly connected to a driving source 52, which may be an electric motor, through a suitable power transmission mechanism (not shown). As a result, the rotating supporting member 12 and the twelve molding die means 14 mounted on it are rotated at a predetermined speed in a predetermined direction (the direction shown by arrow 10 in FIG. 1) by the driving source 52.

An annular supporting block 54 is fixed to the upper surface of the lower base plate 16, and a stationary annular cam block 56 is fixed to the upper surface of the annular supporting block 54. Three annular cams 58, 60 and 62 are formed in the annular cam block 56 (as will be described hereinafter, cam followers provided in the lower die assembly in the molding die means 14 are adapted to come into engagement with these cams 58, 60 and 62). To the under surface of the upper base plate 20 is fixed a stationary annular cam block 64, and three annular cams 66, 68 and 70 are formed in the annular cam block 64 (as will be described in detail hereinafter, cam followers formed in the upper die assembly of the molding die means are adapted to come into engagement with the cams 66, 68 and 70).

Each of the molding die means 14 will be described below. In the illustrated embodiment, each molding die means 14 is comprised of an upper die assembly 72 shown by a two-dot chain line in FIG. 2 and a lower die assembly 74 shown by a two-dot chain line in FIG. 2.

Figure 3:
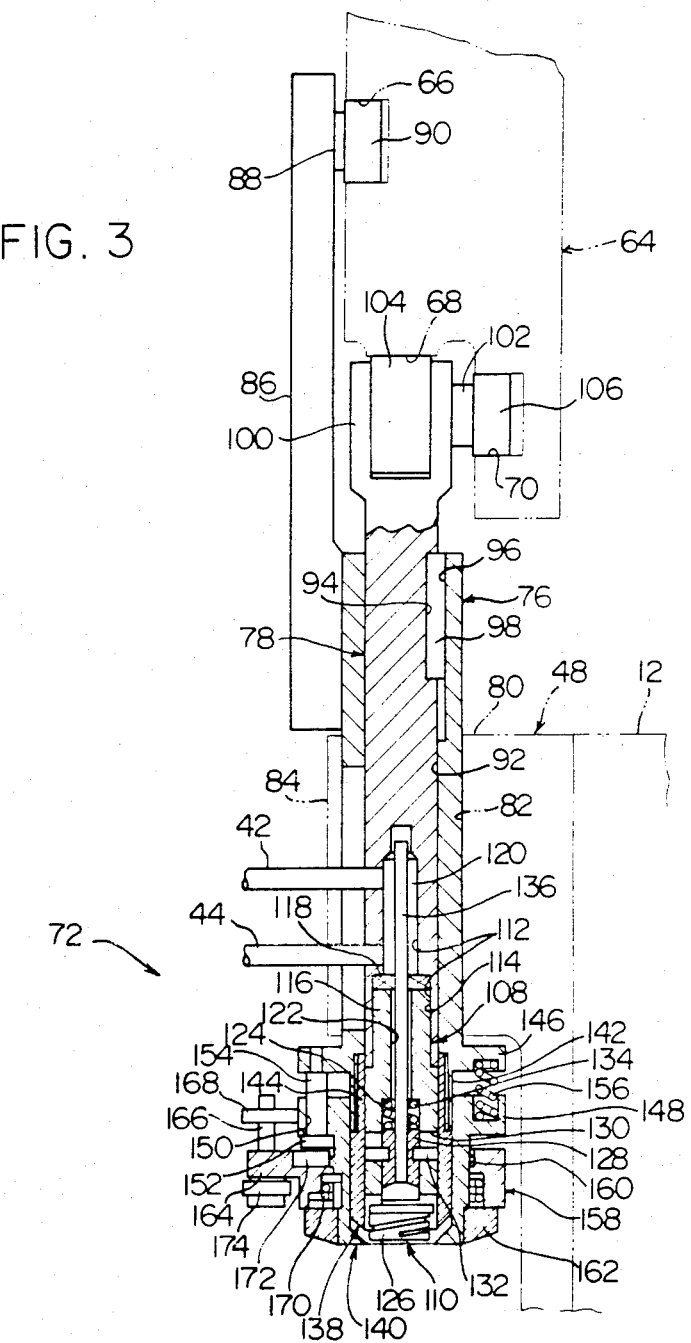
FIG. 3 is a partial sectional view showing an upper die assembly in the compression molding means shown in FIG. 2.

With reference to FIG. 3, the illustrated upper die assembly 72 is provided with an outside supporting member 76 and an inside supporting member 78. The outside supporting member 76 is composed of a square pillar having a nearly square cross section, and mounted on the mounting block 48 for free sliding in a substantially vertical direction. More specifically, the mounting block 48 has at its upper end portion a mounting portion 80 which protrudes diametrically outwardly, and a mounting channel 82 which extends substantially vertically and has an open outside surface in the diametrical direction is formed in the mounting portion 80. The mounting channel 82 has a cross-sectional shape corresponding to the cross-sectional shape of the outside supporting member 76. By placing the outside supporting member 76 in the mounting channel 82, and thereafter, fixing a cover plate 84 to the outside surface of the mounting portion 80, the outside supporting member 76 is mounted for free sliding in a substantially vertical direction. The outside surface of the upper end portion of the outside supporting member 76 is fixed the lower end portion of a member 86. The member 86 extends substantially vertically and a substantially horizontally extending shaft 88 is fixed to the upper end of the member 86. A cam roller 90 forming a cam follower is rotatably mounted on the inside end portion of the shaft 88. The cam roller 90 engages the annular cam 66 formed in the stationary annular cam block 64. When the molding die means 14 is rotated in the direction of arrow 10 in FIG. 1, the annular cam 66 and the cam roller 90 cooperatively elevate or lower the outside supporting member 76 in a required manner. A substantially vertically extending through-hole 92 having a circular cross section is formed centrally in the outside supporting member 76. The inside supporting member 78 is composed of a cylindrical pillar having a circular cross-sectional shape corresponding to the cross-sectional shape of the through-hole 92 and is mounted on the outside supporting member 76 for free sliding in a substantially vertical direction by inserting it into the through-hole 92. The revolving of the inside supporting member 78 within the through-hole 92 is hampered by a key 98 inserted in a key groove 94 formed on the peripheral surface of the inside supporting member 78 and in a key groove 96 formed in the inner circumferential surface of the outside supporting member 76. A bifurcated portion 100 is formed in the upper end portion of the inside supporting member 78, and a substantially horizontally extending shaft 102 is fixed to the bifurcated structure 100. Cam rollers 104 and 106 constituting cam followers are rotatably mounted on the shaft 102, and respectively engage the annular cams 68 and 70 formed on the stationary annular cam block 64. The annular cam 68 and the cam roller 104 cooperating with it and the annular cam 70 and the cam roller 106 cooperating with it elevate and lower the inside supporting member 78 in a required manner when the molding die means 14 is rotated in the direction of arrow 10 in FIG. 1.

Die members 108 and 110 are mounted on the lower end of the inside supporting member 78 (as will be described hereinbelow, these die members 108 and 110 define the top panel wall of a container closure and the inside surface of its skirt wall). Specifically, a downwardly open hole 112 is formed in the lower part of the inside supporting member 78. An internal thread is formed on the inner circumferential surface of a portion 114 having a relatively large diameter located in the lower part of the hole 112. The die member 108 is nearly cylindrical on the whole, and an external thread is formed on the peripheral surface of a portion 116 having a relatively small diameter located at its upper end. The die member 108 is fixed to the lower end of the inside supporting member 78 by threadably fitting the portion 116 located at its upper end into the portion 114 of the hole 112. Within the hole 112 is disposed a seal member 118 located immediately above the upper end of the die member 108, and that part of the hole 112 which is above the seal member 118 defines a cooling medium flowing space 120. A cooling medium is caused to flow into the cooling medium flowing space 120 from the tube 42 and then discharged from the space 120 through the tube 44. The upper half of the through-hole 122 has a relatively small diameter, while its lower half has a relatively large diameter. A downwardly directed shoulder portion 124 exists in the boundary area between them. The die member 110, on the other hand, has a main portion 126 and a cylindrical mounting portion 128 extending upwardly from the main portion 126. The cross-sectional shape of the mounting portion 128 of the die member 110 corresponds to the cross-sectional shape of the lower half of the hole 122 of the die member 108, and the die member 110 is mounted for free sliding in a substantially vertical direction by inserting its mounting portion 128 into the lower half of the hole 122 of the die member 108. Vertically extending elongate slots 130 are formed in the lower half of the die member 108 at a plurality of circumferentially spaced positions, and corresponding thereto, diametrically outwardly projecting pins 132 are fixed to the mounting portion 128 of the die member 110 at a plurality of circumferentially spaced positions. The diametrically outside parts of the pins 132 are located within the slot 130, and therefore, the ascending or descending movement of the die member 110 with respect to the die member 108 is restricted to a space between an upper limit position at which the pins 132 abut against the upper end of the slot 130 and a lower limit position (the position shown in FIG. 3) at which the pins 132 abut against the lower end of the slot 130. Between the shoulder portion 124 in the hole 122 of the die member 108 and the mounting portion 128 of the die member 110 is disposed a spring means 134 for elastically biasing the die member 110 to the aforesaid lower limit position with respect to the die member 108.

In the illustrated embodiment, there is also disposed a heat pipe 136 for cooling the die member 110 (and the die member 108) sufficiently effectively. The heat pipe 136 may be of any known form, and its heat absorbing lower end portion is inserted in, and fixed to, the die member 110. On the other hand, the heat releasing upper end portion of the heat pipe 136 is received in the cooling medium flowing space 120 for free ascending and or descending movement. Heat transmitted from a plastic material to be compression-molded to the die member 110 (and the die member 108) is absorbed by the heat absorbing end portion of the heat pipe 136, and released into the cooling medium flowing in the space 120 from its heat releasing end portion. As a result, the die member 110 (and the die member 108) is sufficiently effectively cooled. It should be noted in this regard that it is extremely difficult, if not impossible, to cool the die member 110 sufficiently effectively by directly passing a cooling medium through it because of its slidability to the die member 108 and to the inside supporting member 78, its relatively small size, etc., but that the use of the heat pipe 136 in the illustrated embodiment can lead to an effective cooling of the die member 110.

Figure 4:
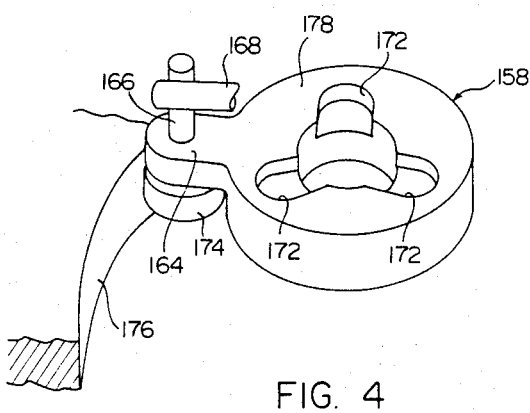
FIG. 4 is a partial perspective view showing a restricted member and its related structure in the upper die assembly shown in FIG. 3.

Die members 138 and 140 are mounted on the lower end of the outside supporting member 76 (these die members 138 and 140 define the outside surface of a pilferproof bottom portion existing in the lower end portion of the skirt wall of a container closure as will be described in detail hereinafter). More specifically, a downwardly projecting cylindrical projecting portion 142 is formed at the lower end of the outside supporting member 76. The inside diameter of the projecting portion 142 is slightly larger than the outside diameter of the die member 108 fixed to the lower end of the inside supporting member 78, and an internal thread is formed on the inner circumferential surface of the projecting portion 142. The die member 138 is nearly cylindrical on the whole, and an external thread is formed on the outer circumferential surface of a portion 144 having a relatively smalll diameter existing in its upper half. The die member 138 is fixed to the lower end of the outside supporting member 76 by threadably fitting the portion 144 into the projecting portion 142. As shown in FIG. 3, the die member 138 is located outwardly of the die member 108 fixed to the lower end of the inside supporting member 78, and the inside diameter of the die member 138 is made substantially the same as the outside diameter of the die member 108. The outside diameter of the lower half portion of the die member 138 is substantially the same as the outside diameter of the projecting portion 142. The die member 140 is disposed outwardly of the die member 138 and mounted on the outside supporting member 76 so that it can freely slide over a predetermined range in the direction of the longitudinal axis of the outside supporting member 76, namely in a vertical direction. A circular flange 146 is formed in the lower end portion of the outside supporting member 76, and correspondingly to it, a circular flange 148 is formed at the upper end of the die member 140. A plurality of (for example three) vertically extending holes 150 (only one of which is shown in FIG. 3) are formed in the circular flange 148 at circumferentially spaced positions. The die member 140 is mounted on the outside supporting member 76 by inserting the main axial portion of a linking pin 154 having an enlarged head portion 152 at its lower end and an external thread formed at its upper end portion into the hole 150, and threadably mounting the upper end portion of the linking pin 154 on the circular flange 146 of the outside supporting member 76. It will be readily appreciated by reference to FIG. 3 that the die member 140 can freely slide vertically relative to the outside supporting member 76 and the die member 138 fixed to it between a lower limit position, i.e. a projecting position (the position shown in FIG. 3), at which the under surface of the circular flange abuts against the enlarged head portion 152 of the linking ping 154 and an upper limit position, i.e. a retracted position, at which the diametrically inwardly projecting portion formed in the inner circumferential surface of its lower end abuts against the under surface of the die member 138. Spring means 156 (only one of which is shown in FIG. 3) which may be compression coil springs are disposed at a plurality of (for example, three) circumferentially spaced positions between the circular flange 146 of the outside supporting member 76 and the circular flange 148 of the die member 140. These spring means 156 elastically bias the die member 140 to the aforesaid projecting position (the position shown in FIG. 3). In relation to the die member 140, an ascending hampering means is also provided in the illustrated embodiment which selectively hampers the ascending of the die member 140 to the retracted position from its projecting position. The ascending hampering means includes a restricted member 158 in the form of a nearly annular plate disposed outwardly of the die member 140. The ascending of the restricted member 158 is hampered by a plurality of protrusions 160 formed at circumferentially spaced intervals on the peripheral surface of the die member 140, and its descending is hampered by a lock nut 162 threadably mounted on the peripheral surface of the lower end of the die member 140. Thus, the restricted member 158 cannot move vertically with respect to the die member 140 but can rotate about the die member 140. With reference to FIG. 4 taken in conjunction with FIG. 3, a diametrically outwardly extending projecting portion 164 is formed in the restricted member 158, and a vertically extending pin 166 is fixed to the projecting portion 164. On the other hand, a diametrically outwardly extending pin 168 is fixed to the circular flange 148 of the die member 140. As shown in FIG. 3, a spring means 170 which may be a tortion coil spring is interposed between the die member 140 and the restricted member 158. The spring means 170 elastically biases the restricted member 158 counterclockwise as viewed from above in FIG. 3 with respect to the die member 140, and thus elastically holds the restricted member 158 at a first angular position at which the pin 166 abuts against the pin 168, namely at the angular position shown in FIGS. 3 and 4. As clearly shown in FIG. 4, three circumferentially spaced recesses or escape portions 172 are formed on the upper surface of the restricted member 158. When the restricted member 158 is at the aforesaid first angular position, each of the three escape portions 172 is positioned in alignment with the enlarged head portion 152 of the linking pin 154. Hence, by accomodating the enlarged head portion 152 in the escape portion 172, the restricted member 158 can be raised together with the die member 140 with respect to the outside supporting member 76, and consequently, the die member 140 can ascend to the aforesaid retracted position. On the other hand, a cam follower means 174 is rotatably mounted on the lower end of the pin 166, and as shown in FIG. 1, a stationary cam means 176 (the member constituting the stationary cam means 176 is fixed to the lower base plate 16 via a suitable supporting member) adapted to act on the cam follower means 174 is provided downstream of the cooling zone C as viewed in the rotating direction 10 of the rotary compression molding means 2. When the molding die means 14 rotates and comes downstream of the cooling zone C, the stationary cam means 176 acts on the cam follower means 174 whereby the restricted member 158 is rotated through about 30 degrees for example, in a clockwise direction as viewed from above in FIG. 3 against the elastic biasing action of the spring means 170 and brought to a second angular position. As a result, the escape portions 172 formed on the upper surface of the restricted member 158 come into out of alignment with the enlarged head portion 152 of the linking pin 154, and that part of the upper surface of the restricted member 158 which is between the escape portions 172, namely an abutting portion 178, is located opposite to the enlarged head portion 152 of the linking pin 154. Accordingly, as can be easily seen by referring to FIGS. 3 and 4, the abutting portion 178 of the restricted member 158 abuts against the enlarged head portion 152 to hamper the rising of the restricted member 158, and therefore, the die member 140 is prevented from rising to the aforesaid retracted position from the aforesaid projecting position (the position shown in FIG. 3).

Figure 5:
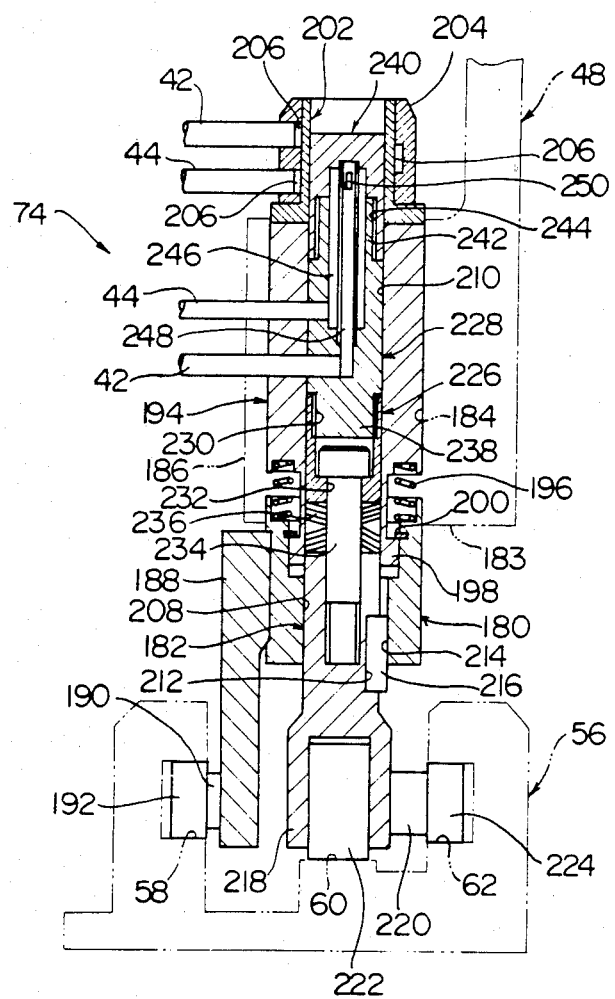
FIG. 5 is a partial sectional view showing a lower die assembly in the rotating compression molding means in FIG. 2.

Now, with reference to FIG. 5, the lower die assembly 74 will be described. The illustrated lower die assembly 74 is provided with an outside supporting member 180 and an inside supporting member 182. Also, with reference to FIG. 2, the mounting block 48 for molding die means also has a diametrically outwardly protruding mounting portion 183 at its lower end portion corresponding to the diametrically outwardly protruding portion 80 formed at its upper end portion (the upper die assembly 72 is mounted on the mounting portion 80). A mounting channel 184 extending substantially vertically and having an open diametrically outside surface is formed in the mounting portion 183. The cross-sectional surface of the mounting channel 184 is substantially square. A cover plate 186 is fixed to the diametrically outside surface of the mounting portion 183 to cover at least partly the open diametrically outside surface of the mounting channel 184. Again, with reference to FIG. 5, the outside supporting member 180 is composed of a square pillar having a cross-sectional shape corresponding to the cross-sectional shape of the mounting channel 184, and its upper end portion is slidably received in the mounting channel 184. The upper end portion of a member 188 is fixed to the outside surface of the outside supporting member 180. To the lower end portion of the member 188 extending downwardly in a substantially vertical fashion is fixed a substantially horizontally extending shaft 190, and a cam roller 192 constituting a cam follower is mounted rotatably on the outside end portion of the shaft 190. The cam roller 192 engages the annular cam 58 formed in the stationary cam block 56. When the molding die means 14 is rotated in the direction of arrow 10 in FIG. 1, the annular cam 58 and the cam roller 192 cooperatively raise or lower the outside supporting member 180 in a required manner. An outside power transmission member 194 is also provided in the mounting channel 184. The outside power transmission member 194 is composed of a square pillar having a cross-sectional shape corresponding to the cross-sectional shape of the mounting channel 184, and is received slidably in the mounting channel 184. A spring means 196 is interposed between the outside supporting member 180 and the outside power transmission member 194. The spring means 196 which may be made up of a plurality of circumferentially spaced compression coil springs (two of which are shown in FIG. 5) elastically biases the outside power transmission member 194 vertically upwardly. The outside power transmission member 194 has a downwardly extending part which extends downwardly beyond the spring means 196. A diametrically outwardly protruding annular protruding portion 198 is formed at the lower end of the downwardly extending part of the member 194, and a stop ring 200 is fixed to the inner circumferential surface of the upper end portion of the outside supporting member 180. By the abutting of the annular protruding portion 198 against the stop ring 200, the vertically upward movement of the outside power transmission member 194 is restricted. To the upper end of the outside power transmission member 194 is fixed a nearly cylindrical die member 202 (which, as will be described in detail hereinafter, defines the outside surface of the main part of the skirt wall of a container closure). A nearly cylindrical member 204 is fixed to the periphery of the die member 202, and a cooling medium flowing channel 206 extending helically is formed on the inner circumferential surface of the member 204. A cooling medium is caused to flow into the cooling medium flowing channel 206 from the tube 42, and after flowing through the channel 206, flow away, thereby to cool the die member 202.

Substantially vertically extending through-holes 208 and 210 having a circular cross-sectional shape are formed centrally in the outside supporting member 180 and the outside power transmission member 194 respectively. The upper half of the inside supporting member 182 has a circular cross-sectional surface corresponding to the cross-sectional shape of the through-holes 208 and 210, and is received slidably in the through-holes 208 and 210. The revolution of the inside supporting member 182 in the through-holes 208 and 210 is hampered by a key 216 inserted both in a key groove 212 formed in the peripheral surface of the inside supporting member 182 and in a key groove 214 formed in the inner circumferential surface of the outside supporting member. A bifurcated structure 218 is formed in the lower end portion of the inside supporting member 182, and a substantially horizontally extending shaft 220 is fixed to the bifurcated structure 218. Cam rollers 222 and 224 constituting a cam follower are rotatably mounted on the shaft 220. The cam rollers 222 and 224 respectively engage the annular cams 60 and 62 formed in the stationary annular cam block 56. The annular cam 60 and the cam roller 222 cooperating with it and the annular cam 62 and the cam roller 224 cooperating with it raise or lower the inside supporting member 182 in a required manner when the molding die means 14 is rotated in the direction of arrow 10 in FIG. 1. Two members having a circular cross-sectional shape corresponding to the cross-sectional shape of the through hole 210, namely a first inside power transmission member 226 and a second inside power transmission member 228, are slidable received in the through-hole 210 formed in the outside power transmission member 194. The first inside power transmission member 226 has formed therein a through-hole having an upper portion 230 of a relatively large diameter and a lower portion 232 of a relatively small diameter. The axial portion of a bolt 234 whose head is received in the upper portion 230 of the through-hole extends through the lower portion 232 of the through-hole, and the lower end portion of the bolt 234 is threadably mounted on the upper part of the inside supporting member 182. A spring means 236 for elastically biasing the first inside power transmission member 226 vertically upwardly is interposed between the upper end of the inside supporting member 182 and the lower end of the first inside power transmission member 22. The vertically upward movement of the first inside power transmission member 226 is restricted by the abutting of an upwardly directed shoulder portion existing in the boundary between the upper portion 230 and the lower portion 232 of the through-hole against the head portion of the bolt 234. As will be clarified by a description given hereinafter, the spring means 236 should elastically bias the first inside power transmission member 226 with a considerably large force, and therefore, is conveniently made up of a plurality of plate springs stacked as shown in the drawing. An internal thread is formed on the inner surface of the upper end portion of the upper portion 230 of the through-hole in the first inside power transmission member 226, and corresponding to it, a small-diameter portion 238 having an external thread formed on its peripheral surface exists at the lower end portion of the second inside power transmission member 228. By threadably fitting the small-diameter portion 238 into the upper portion 230 of the aforesaid through-hole, the lower end portion of the second inside power transmission member 228 is fixed to the upper end portion of the first inside power transmission member 226. A die member 240 located inwardly of the die member 202 fixed to the upper end of the outside power transmitting member 194 (the die member 240, as will be described hereinafter, defines the outside surface of the top panel wall of a container closure) is fixed to the upper end of the second inside power transmission member 228. A small-diameter portion 242 having an external thread formed on its peripheral surface exists in the upper end portion of the second inside power transmission member 228, and corresponding to it, a hole 244 having an internal thread formed on its inner circumferential surface is located in the lower end portion of the die member 240. The die member 240 is fixed to the second inside power transmission member 228 by threadable engagement between the lower end portion of the die member 240 and the upper end portion of the second inside power transmission member 228. Blind holes cooperatively defining a cooling medium flowing space 246 are formed respectively in the upper half of the second inside power transmitting member 228 and the lower half of the die member 240. A tube 248 is concentrically fixed within the cooling medium flowing space 246. A cooling medium is caused to flow into the tube 248 form the tube 42, rises within the tube 248 and flows into the cooling medium flowing space 246 through an opening 250 formed in the upper end portion of the tube 248, after which it flows away through the tube 44. As a result, the die member 240 is cooled by the cooling medium. As will become clear from a description given later on, a number of vertically extending grooves for defining a number of axially extending protrusions on the outside surface of the main portion of a skirt wall in a container closure are formed on the inner circumferential surface of the die member 202 fixed to the upper end of the outside power transmission member 194, and corresponding to these, a number of protrusions are formed on the peripheral surface of the die member 240 fixed to the upper end of the second inside power transmission member 228. By partial engagement between the grooves and the protrusions, the revolution of the die member 240 itself within the die member 202 is inhibited.

Figure 6:
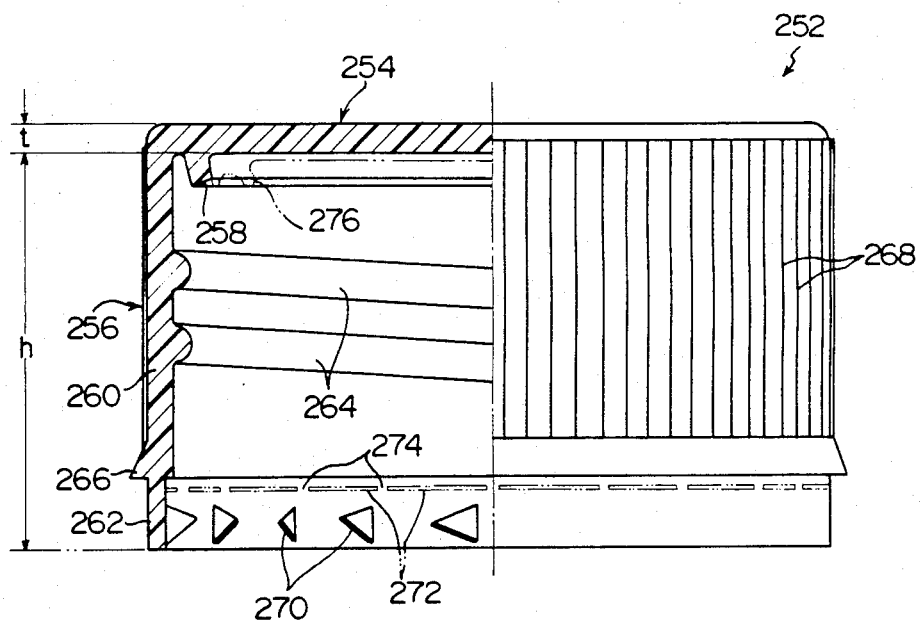
FIG. 6 is a side elevation, partly in section, of a container closure molded by the compression molding apparatus shown in FIG. 1.

The molding die means 14 comprised of the upper die assembly 72 and the lower die assembly 74 is closed and opened in a predetermined manner while being moved through the circular conveying passage incident to the rotation of the rotating supporting member 12, and compression-molds the material into a container closure 252 in an upside-down state (upside down with respect to the normally standing state shown in FIG. 6) as shown in FIG. 6. With reference to FIG. 6, the container closure 252 has a circular top panel wall 254 and a cylindrical skirt wall extending downwardly from the peripheral edge of the top panel wall 254. An annular protrusion 258 is formed on the inner surface of the top panel wall 254. The skirt wall 256 has a main portion 260 having a relatively large thickness and a pilferproof bottom portion 262 having a relatively small thickness. An internal thread 264 is formed on the inner surface of the main portion 260 of the skirt wall 256, and an annular protrusion 266 having a substantially horizontally under surface is formed in the lower end portion of the outside surface of the main portion 260. A number of slip-preventing protrusions 268 extending axially in circumferentially spaced intervals are formed in that area of the outside surface of the main portion 260 which is above the annular protrusion 266. On the inner surface of the pilferproof bottom portion 262 are formed a plurality of flaps 270 projecting diametrically inwardly at circumferentially spaced positions.

According to the illustrated embodiment of the compression molding apparatus constructed in accordance with this invention, the container closure 252 having the aforesaid structure is formed by compression molding. The closure 252 is further subjected to the following treatment after compression molding. A plurality of circumferentially extending slits 272 are formed at some circumferentially spaced intervals as shown by the two-dot chain line in FIG. 6 in the boundary between the main portion 260 and the pilferproof bottom portion 262 of the skirt wall 256 to form a weakened line composed of bridging portions 274 remaining among the slits 272. A seal member 276 composed of a suitable plastic material different from the plastic material constituting the closure 252 itself is applied to the annular protrusion 258 in the inner surface of the top panel wall 254. The closure 252 described above is only one example, and details of the structure and operation of the closure 252 itself are omitted in the present specification (for details about the closure 252, reference may, as required, be made to the specifications of Japanese Laid-Open Patent Publications Nos. 74445/1981, 30949/1983 and 51116/1983, for example).

The operation of the molding die means 14 will be described in summary. FIGS. 7-A, 7-B, 7-C and 7-D are cam diagrams respectively showing the ascending and descending movement of the outside supporting member 76 of the upper die assembly 72 by the cooperative action of the annular cam 66 and the cam roller 90, the ascending and descending movement of the inside supporting member 78 of the upper die assembly 72 by the cooperative action of the annular cam 68 and the cam roller 104 and the cooperative action of the annular cam 70 and the cam roller 106, the ascending and descending action of the outside supporting member 180 of the lower die assembly 74 by the cooperative action of the annular cam 58 and the cam roller 192, and the ascending and descending movement of the inside supporting member 182 of the lower die assembly 74 by the cooperative action of the annular cam 60 and the cam roller 222 and the cooperative action of the annular cam 62 and the cam roller 224. With reference to these cam diagrams, FIG. 1 and FIGS. 8-A to 8-F, it is seen that when the molding die means 14 is positioned in the material charging zone A shown in FIG. 1, the upper die assembly 72 and the lower die assembly 74 are separated from each other in the vertical direction as shown in FIG. 8-A. In this state, a predetermined amount of a suitable plastic material 278 such as polyethylene or polypropylene in the molten state is fed into the molding die means 14, and more specifically, into the die member 240 of the lower die assembly 74, from the material feed means 4 (the material feed means 4 will be described in detail hereinafter). When the molding die means 14 then rotates in the direction of arrow in FIG. 1 and enters the molding zone B, the outside supporting member 76 and the inside supporting member 78 are gradually lowered, and simultaneously the outside supporting member 180 and the inside supporting member 182 of the lower die assembly 74 are gradually raised, as the molding die means 14 rotates. Before the molding die means 14 reaches the position shown by B-1 in FIG. 1, the lower end of the die member 140 of the upper die assembly 72 abuts against the upper end of the die member 202 of the lower die assembly 74, and because of this, the die member 140 of the upper die assembly 72 is elevated relative to the outside supporting member 76 and the die member 138 fixed to it against the elastic biasing action of the spring means 156 (FIG. 3) and brought to the aforesaid retracted position (see FIG. 8-B) from the aforesaid projecting position (see FIG. 8-A). While the molding die means 14 rotates from the position shown by B-1 in FIG. 1 to the position shown by B-2, the outside supporting member 180 of the lower die assembly 74, and therefore the die member 202, are lowered as the outside supporting member 76 of the upper die assembly 72, and therefore the die members 138 and 140, are lowered. As a result, at the position B-2, the die members 138, 140 and 202 assume the positions shown in FIG. 8-B. On the other hand, while the molding die means 14 rotates from the position B-1 to the position B-2, the inside supporting member 182 of the lower die assembly 74 and therefore the die member 240 are held at their uppermost positions without further rising. But the inside supporting member 78 of the upper die assembly 72 is kept descending and the lower end of the die member 110 abuts against the plastic material 278. Accordingly, the die member 110 is raised to the raised position shown in FIG. 8-B (at this raised position, the lower surface of the main portion 126 of the die member 110 abuts against the lower surface of the die member 108) relative to the inside supporting member 78 and the die member 108 against the elastic biasing action of the spring member 134 (FIG. 3). Furthermore, as shown in FIG. 8-B, the plastic material 278 is slightly compressed and deformed between the die member 110 and the die member 240. While the molding die means 14 rotates from the position B-2 to the downstream end of the molding zone B (and therefore the upstream end of the cooling zone C), the inside supporting member 78 of the upper die assembly 72, and therefore the die members 108 and 110, are lowered slightly. As a result, the plastic material 278 is compressed and deformed into the closure 252, as can be understood from a comparison of FIG. 8-B with FIG. 8-C. It will be appreciated in this regard by comparison of FIG. 8-B with FIG. 9-C and also by referring to FIGS. 7-A and 7-C that since in the aforesaid compression molding, the outside supporting member 76 of the upper die assembly 72, and therefore the die members 138 and 140, are elevated by a predetermined amount and the outside supporting member 180 of the lower die assembly 74, and therefore the die member 202, are also elevated by a predetermined amount, the reflowing of the plastic material 278 for skirt wall formation between the peripheral surface of the die member 110 and the inner circumferential surfaces of the die members 202, 140 and 138 is promoted, and the closure 252 is accurately molded as predetermined.

The following fact should further be noted with regard to the compression molding operation. It is extremely difficult, if not impossible, to adjust the amount of the plastic material 278 to be fed to the molding die means 14 in the material charging zone A quite precisely to the required one, and generally, there is some variation in the amount of the plastic material 278 to be fed to the molding die means 14. According to the molding die means 14 in the compression molding apparatus 2 constructed in accordance with this invention, the variations in the amount of the plastic material 278 can be corrected by changing the thickenss t (FIG. 6) of the top panel wall 254 of the closure 252 without changing the effective height h (FIG. 6) from the inner surface of the top panel wall 254 to the lower end of the skirt wall 256. Specifically, in the illustrated molding die means 14, the positions shown in FIG. 8-C of the die members 110 and 108 at the inside supporting member 78 of the upper die assembly 72, and the positions shown in FIG. 8-C of the die members 140 and 138 at the outside supporting member 76 of the upper die assembly 72 (and therefore, the position shown in FIG. 8-C of the die member 202 of the lower die assembly 74) are mechanically defined at fixed positions by the cooperative action of the annular cam 68 and the cam roller 104, the cooperative action of the annular cam 70 and the cam roller 106 and the cooperative action of the annular cam 66 and the cam roller 90. In contrast, in the lower die assembly 74, the position of the inside supporting member 182 in FIG. 8-C is mechanically defined at a fixed position by the cooperative action of the annular cam 60 and the cam roller 222 and the cooperative action of the annular cam 62 and the cam roller 224, but the spring means 236 is interposed between the inside supporting member 182 and the die member 240. The spring means 236 elastically biases the die member 240 upwardly with a force large enough to compression-mold the plastic material 278, but the action of a force greater than the elastic biasing force of the spring means 236 on the die member 240 causes the die member 240 to descend against the elastic biasing action of the spring means 236. If, therefore, the amount of the plastic material 278 fed is, for example, slightly larger than a predetermined amount, the die member 240 is lowered slightly from the predetermined position, and the thickness t of the top panel wall 254 becomes larger by an amount corresponding to the lowering of the die member 240 and thus sets off the excess of the amount of the fed plastic material 278. If, on the other hand, the amount of the fed plastic material 278 is slightly smaller than the predetermined amount, the die member 240 slightly rises from the predetermined position. As a result, the thickness t of the top panel wall 254 becomes smaller by an amount corresponding to the rising of the die member 240, and thus sets off the shortage of the amount of the plastic material 278. Generally, the effective height h of the closure 252 is important to the sealing property, etc. of the closure 252, but the thickness t itself of the top panel wall 254 does not adversely affect the sealing property, etc. of the closure 252. Accordingly, the illustrated molding die means 14 can permit molding of the container closure 252 having the required sealing property, etc. irrespective of some variations in the amount of the plastic material 278 fed.

While the molding die means 14 continues to rotate in the direction of arrow 10 in FIG. 1 and is passing through the cooling zone C, the die members 110, 108, 140 and 138 of the upper die assembly 72 and the die members 202 and 204 of the lower die assembly 74 are held at the positions shown in FIG. 8-C. During this time, the molded closure 252 is fully cooled. When the molding die means 14 has left the cooling zone C and further continues to rotate, the outside supporting member 76 and the inside supporting member 78 of the upper die assembly 72 are gradually raised, and the outside supporting member 180 and the inside supporting member 182 of the lower die assembly are gradually lowered. At this time, in the upper die assembly 72, the die member 110 descends to its lowest position shown in FIG. 8-D relative to the inside supporting member 78 and the die member 108, and the die member 140 descends to its projecting position shown in FIG. 8-D relative to the outside supporting member 76 and the die member 138. As a result, the die members 110 and 140 assume the state shown in FIG. 8-D. In this state, the die members 108 and 138 are out of engagement with the closure 252. When the state shown in FIG. 8-D is assumed, the stationary cam means 176 acts on the cam follower means 174 to bring the restricted member 158 to the second angular position against the elastic biasing action of the spring 170 as described hereinabove with reference to FIGS. 3 and 4. Consequently, when the die member 110 is later moved away from the closure 252, the die member 140 is prevented from rising relative to the outside supporting member 76 and the die member 138 and returning to its retracted position from its projecting position. Thereafter, the rising of the outside supporting member 76 of the upper die assembly 72, and therefore the die members 140 and 138, is interrupted, but the inside supporting member 78 of the upper die assembly 72 and therefore the die members 110 and 108 continue to rotate, and the outside supporting member 180 of the lower die assembly 74 and therefore the die members 202, and the inside supporting member 182 and therefore the die member 240 continue to descend. As a result, the die members 110, 202 and 240 are moved away from the closure 252 as shown in FIG. 8-E. Then, the rising of the outside supporting member 76 of the upper die assembly 72 and therefore the die members 140 and 138 is resumed, and as shown in FIG. 8-F, the die member 140 is also moved away from the closure 252, and the closure 252 is dropped onto the article carrying means 6 (which will be described in detail hereinafter) in the article discharging zone D. While the molding die means 14 further rotates toward the material charging zone A, the outside supporting member 76 and the inside supporting member 78 of the upper die assembly 72 are further raised, and the outside supporting member 180 and the inside supporting member 182 of the lower die assembly 74 are further lowered. As a result, the die members 108, 110, 138 and 140 of the upper die assembly 72 and the die members 202 and 240 of the lower die assembly 74 are returned to the state shown in FIG. 8-A.

Material Feed Means

The material feed means 4 will now be described in detail.

With reference to FIG. 1, the illustrated material feed means 4 is provided with an extruding means 280 comprised of an extruder 282, a conduit means 284 and a die head 285. The extruder 282 which may be of a known type heat-melts a suitable plastic material such as polyethylene or polypropylene and discharges the molten material from its exit. One end of the conduit means 284 is connected to the exit of the extruder 282, and its other end is connected to the inlet of the die head 286. The molten plastic material discharged from the exit of the extruder 282 is fed to the die head 286 through the conduit means 284. As will be described in more detail hereinafter, an extrusion opening which may be circular is formed in the front surface (the upper surface in FIG. 1) of the die head 286, and the molten plastic material fed to the die head 286 is extruded through the extrusion opening. As will be described in detail hereinafter, a cutting means is provided in relation to the extrusion opening of the die head 286. The plastic material extruded from the extrusion opening is cut by the cutting means and fed to the molding die means 14 in the material charging zone A.

In the illustrated material feed means 4, the die head 286 (and at least a part of the cutting means provided in relation to it) are mounted on a supporting frame 292 mounted for free sliding between an operating position shown by a solid line in FIG. 1 and a non-operating position shown by a two-dot chain line in FIG. 1. When the plastic material is actually fed to the molding die means 14 in the material charging zone A, the supporting frame 292 is held at the operating position, and therefore, the die head 286 and its related structure are positioned in a required relation to the molding die means 14 in the material feed zone A. When it is desired to inspect the molding die means 14 for maintenance in the material charging means A, the supporting frame 292 is held at the non-operating position and the die head 286 and its related structure are moved away from the material charging zone A. As a result, the molding die means 14 can be inspected fully, easily and safely without hampering by the die head 286 and its related structure. To permit the aforesaid movement of the die head 286 relative to the extruder 282 which is stationary, the conduit means 284 connecting the extruder 282 to the die head 286 includes at least two articulated joints (three articulated joints 294, 296 and 298 in the illustrated embodiment). Specifically, the illustrated conduit means 284 includes a first, a second and a third conduit 300, 302 and 304. The first conduit 300 and the second conduit 302 are connected through the articulated joint 294, the second conduit 302 and the third conduit 304, through the articulated joint 296; and the third conduit 304 and the inlet of the die head 286, through the articulated joint 298. The articulated joint 294 permits pivoting of the second conduit 302 about an axis 306 extending substantially vertically (perpendicular to the sheet surface in FIG. 1) relative to the first conduit 300. The articulated joint 296 permits relative pivoting of the second conduit 302 and the third embodiment 304 about an axis 308 extending substantially vertically. The articulated joint 298 permits pivoting of the third conduit 304 about a substantially vertically extending axis 310 relative to the inlet of the die head 286. Consequently, the die head 286 is permitted to move as shown above relative to the extruder 282.

Figure 9:
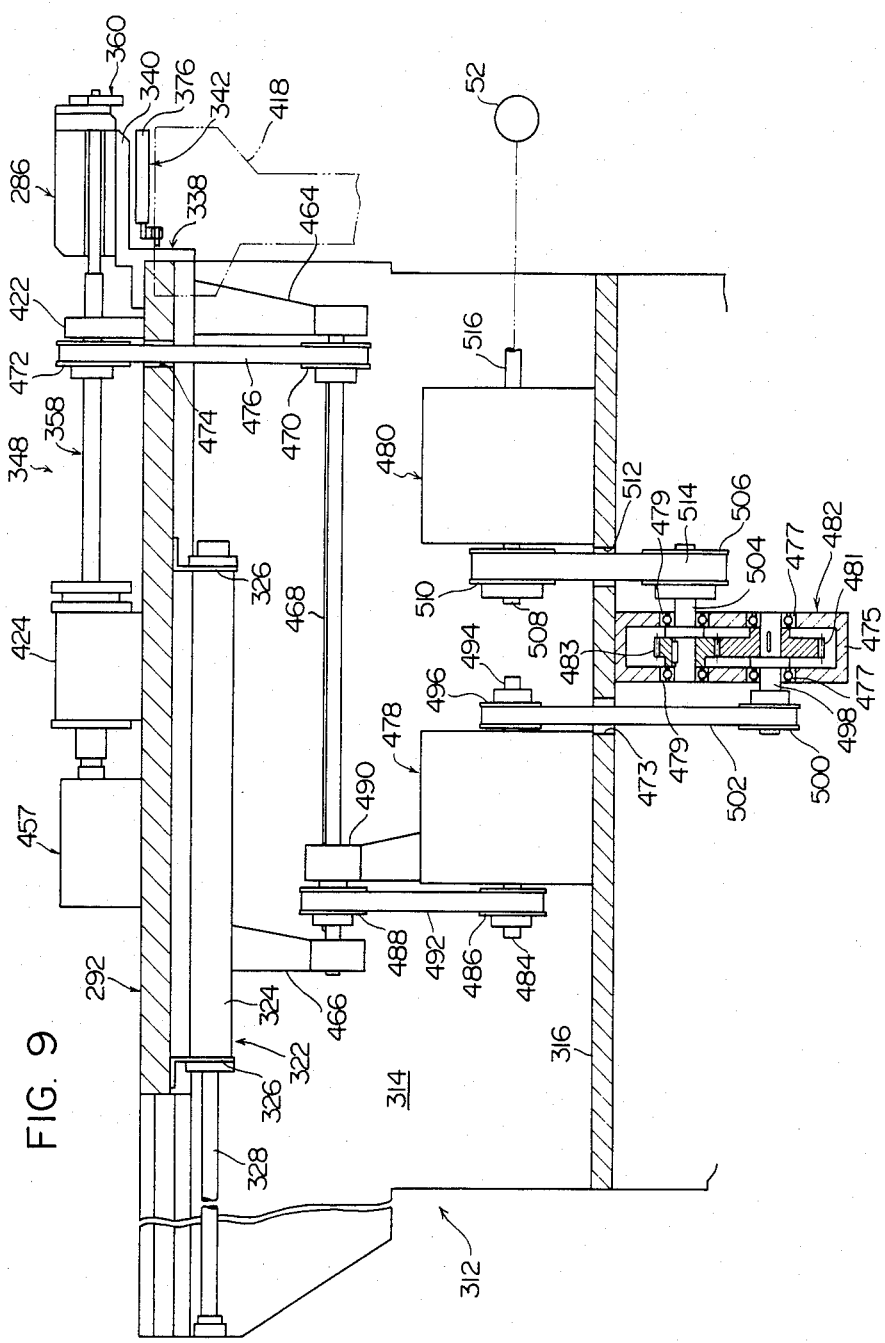
FIG. 9 is a simplified side elevation showing a material feed means in the compression molding apparatus shown in FIG. 1.
Figure 10:
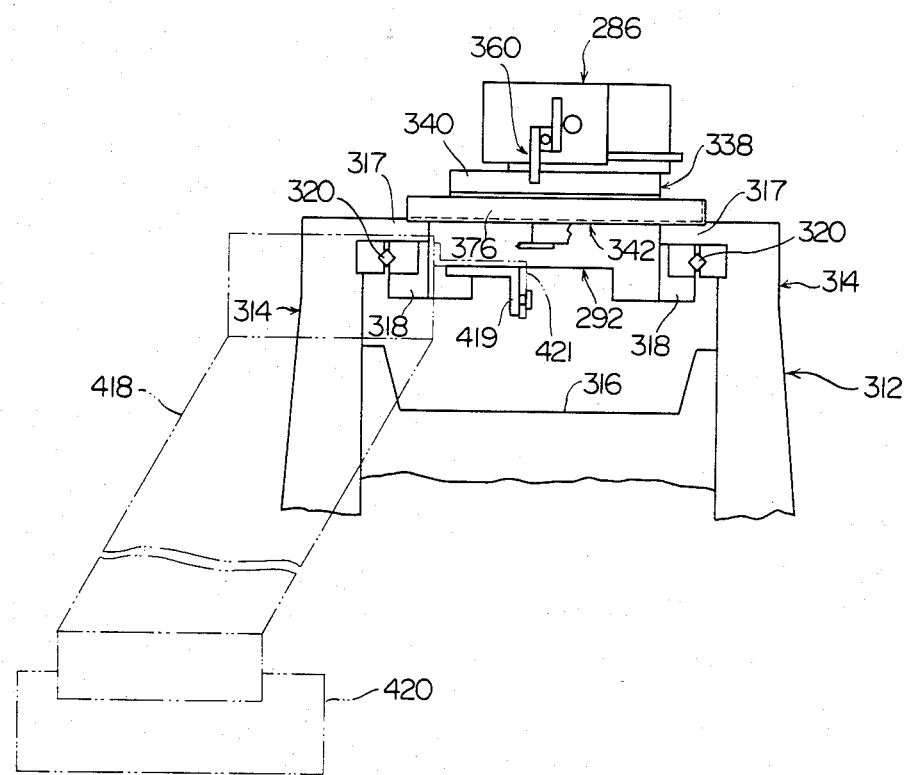
FIG. 10 is a simplified front elevation of the material feed means shown in FIG. 9.

Now, with reference to FIGS. 9 and 10, a stationary base station 312 is disposed at a predetermined position. The stationary base station 312 includes a pair of side wall structures 314 spaced from each other in the left-right direction in FIG. 10 and a horizontal base plate 316 fixed between the side wall structures 314. Inwardly extending guide walls 317 are formed respectively in the upper ends of the pair of side wall structures 314. The supporting frame 292 is mounted between these guide walls 317 so that it can slide freely in the left-right direction in FIG. 9 and in a direction perpendicular to the sheet surface in FIG. 10. In more detail, guided walls 318 having an L-shaped cross section are formed respectively in both side surfaces of the supporting frame 292 which is in the form of an elongate plate as a whole, and the guided walls 318 are secured respectively to the lower surfaces of the guide walls 317 of the pair of said wall structures 314 via roller bearing members 320. As a result, the supporting frame 292 is mounted slidably. As shown in FIG. 9, a fluid pressure cylinder mechanism 322 for sliding the supporting frame 292 is disposed between the supporting frame 292 and the stationary base station 312. The fluid pressure cylinder mechanism 322 is comprised of an air cylinder mechanism extending in the left-right direction in FIG. 9. A cylinder 324 constituting the air cylinder mechanism is fixed to the lower surface of the supporting frame 292 by a pair of securing brackets 326, and a piston 328 also constituting the air cylinder mechanism has a free end fixed to the rear end of the stationary base station 312. Consequently, when the fluid pressure cylinder mechanism 322 is in the extended state, the supporting frame 292 is held at the operating position shown in FIG. 9 (the operating position shown by a solid line in FIG. 1). When the fluid pressure cylinder mechanism 322 is in the contracted state, the supporting frame 292 is moved a predetermined distance to the left in FIG. 9 and held at the non-operating position shown by a two-dot chain line in FIG. 1. If desired, the supporting frame 292 may be slided manually without using moving means such as the fluid pressure cylinder mechanism 322.

With further reference to FIGS. 9 and 10, a supporting bracket 338 is fixed to the front end portion (the right end portion in FIG. 9) of the supporting frame 292. The supporting bracket 338 has a horizontal portion 340 projecting forwardly (to the right in FIG. 9), and the die head 286 is fixed to the horizontal portion 340 (the die head 286 itself will be described more in detail hereinafter). Furthermore, feed hampering means shown generally at 342 (to be described in more detail hereinafter) located below the horizontal portion 340 is mounted on the supporting bracket 338. Most of the constituent elements of a cutting means shown generally at 348 (to be described in more detail hereinafter) are mounted on the supporting frame 292. Accordingly, the die head 286, the feed hampering means 342 and most of the constituent elements of the cutting means 348 are moved between an operating position shown by a solid line in FIGS. 1 and 9 and a non-operating position shown by a two-dot chain line in FIG. 1 incident to the movement of the supporting frame 292.

The die head 286 will be described in detail with reference to FIG. 11. The illustrated die head 286 is comprised of a nearly parallelpipedal die block 350 and a cooling plate 351 and a die plate 352 fixed successively to the front surface of the die block 350. A relatively large cut portion 354 is formed on one side portion of each of the die block 350 and the cooling plate 351, and corresponding to the cut portion 354, a through-hole 356 is formed in the die plate 352. A rotating shaft 358 of the cutting means 348 extends through the cut portion 354 and the through-hole 356, and a rotating cutting blade 360 is secured to the forward end of the rotating shaft 358 which projects forwardly beyond the die plate 352 (the rotating shaft 358 and the rotating cutting blade 360 of the cutting means 348 will be described further hereinafter). An extrusion opening 362 is further formed in the die plate 352. An extrusion flow passage 364 extending from the aforesaid inlet to the extrusion opening 362 is formed in the die block 350 and the cooling plate 351. Thus, the molten plastic material 278 fed to the inlet of the die head 286 from the extruder 282 through the conduit means 284 flows through the extrusion flow passage 364 and is extruded through the extrusion opening 362. The plastic material 278 extruded from the extrusion opening 362 is cut by a cutting edge 368 of the rotating cutting blade 360 rotating in the direction of an arrow 366 and dropped onto the molding die means 14 located in the material charging zone A (FIG. 1), and more specifically onto the die member 240 of the lower die assembly 74 of the molding die means 14 (see FIG. 8-A also). A circulating passage (not shown) through which to circulate a cooling medium such as water is formed in the cooling 351, and via the cooling plate 351 and the die plate 352, the rotating cutting blade 360 is cooled by the cooling medium circulating through the circulating passage.

Experiences of the present inventors tell that when the amount of the plastic material 278 to be cut is relatively large and the rotating speed of the rotating cutting blade 260 is relatively low, the plastic material 278 which has been cut by the cutting edge 368 of the rotating cutting blade 360 and has descended along the surface of the die plate 352 to the lower edge of the die plate 352 incident to the rotation of the rotating cutting blade 360 tends to advance to the under surface of the die plate 352 and adheres to it without leaving the die plate 352 well and dropping downwardly. In order to circumvent this tendency, a gas stream jetting means is provided in the illustrated die head 286.

Figure 13:
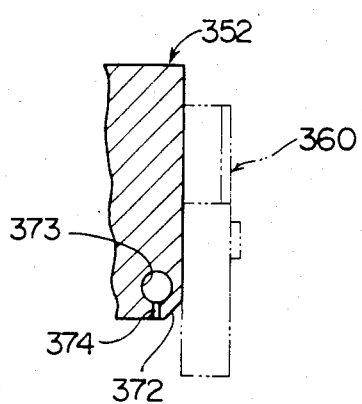
FIG. 13 is a partial sectional view of the die plate shown in FIG. 12.
Figure 12:
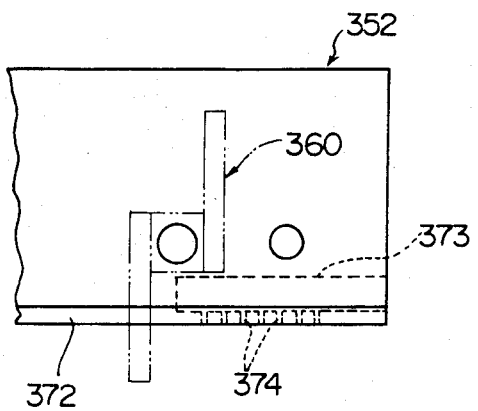
FIG. 12 is a partial front elevation showing a die plate in the die head shown in FIG. 11.
Figure 14:
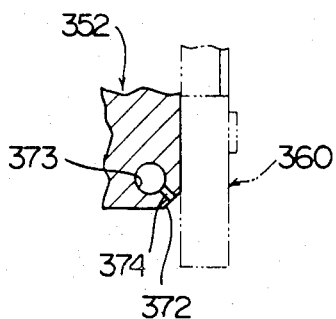
FIGS. 14 and 15 are partial sectional views showing modified examples of the die plate.
Figure 15:
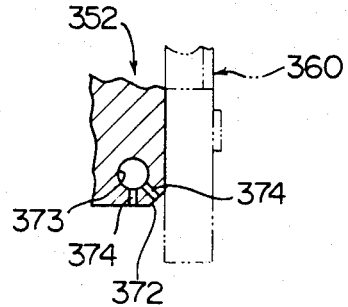
Figure 16:
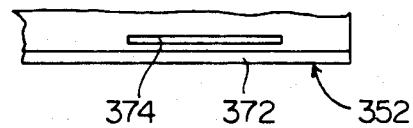
FIG. 16 is a partial bottom view showing a modified example of the die plate.

With reference to FIGS. 12 and 13, in the illustrated die head 286, the front end portion 372 of the lower end surface of the die plate 352 is chamfered and inclined upwardly and forwardly. The gas stream jetting means comprises a flow passage 373 formed in the die plate 352 slightly rearwardy of the front end portion 372, and a plurality of gas jetting holes 374. The flow passage 373 extends laterally from one side surface (the right side surface in FIG. 12) of the die plate 352 over a predetermined length. The plurality of gas jetting holes 374 spaced from each other in the lateral direction extend downwardly in a substantially vertical manner, adjoin the front end portion 372 and are open to the under surface of the die plate 352 rearwardly of the front end portion 372. A gas which may be compressed air is supplied from a gas supply source (not shown) to the flow passage 373 and jetted out from the gas jetting holes 374. The plastic material 278 which has descended over the surface of the die plate 352 to the lower end edge of the die plate 352 incident to the rotation of the rotating cutting blade 360 is effectively prevented from advancing to the under surface of the die plate 352 by the action of the gas streams jetted out from the gas jetting holes 374. The action of the gas streams also aids in removing the plastic material 278 from the rotating cutting edge 360. Hence, the plastic material 278 is dropped while sufficiently and accurately drawing a required track, and thus supplied to the die member 240 (FIG. 8-A) of the lower die assembly 74 in the molding die means 14. If desired, as shown in FIG. 14, it is possible to incline the gas jetting holes 374 forwardly and downwardly from the flow passage 373 and open them to the front end portion 372 of the die plate 352. Furthermore, as shown in FIG. 15, it is possible to form both a gas jetting hole 374 extending substantially vertically downwardly from the flow passage and a gas jet hole 374 extending downwardly from the flow passage 373 in a forwardly inclined state. As another alternative, gas jet holes 374 in the form of a continuously laterally extending elongate slit may be provided instead of providing the plurality of gas jetting holes 374 in laterally spaced relation, as shown in FIG. 16.

The feed hampering means 342 will be described in detail with reference to FIG. 17 in conjunction with FIGS. 9 and 10. The illustrated feed hampering means 342 comprises a receiving member 376 in the form of an elongated rectangular tray and a positioning means 378 comprised of a pneumatic pressure cylinder mechanism. A receiving stand 380 is fixed to the supporting bracket 338 (see FIGS. 9 and 10) secured to the supporting frame 292 through a suitable linking member (not shown). The receiving member 376 is movably placed on the receiving stand 380. Mainly with reference to FIG. 17, a substantially horizontally projecting linking piece 382 is fixed to one side surface of the receiving member 376, and the upper end of a substantially vertically extending pin 384 is fixed to the linking piece 382. A supporting member 386 is also fixed to the supporting bracket 338 (FIGS. 9 and 10), and a substantially vertically extending pin-receiving hole is formed in the front end portion of the supporting member 386. The pin 384 is rotatably inserted in the pin-receiving hole of the supporting member 386. A linking piece 390 is fixed to the lower end of the pin 384 which projects downwardly from the pin receiving hole, and a linking piece 392 is pivotably connected to the linking piece 390. To the linking piece 392 is fixed the forward end of a piston rod 394 in the pneumatic cylinder mechanism constituting the positioning means 378.

On the other hand, a supporting member 396 is also fixed to the supporting bracket 338 (FIGS. 9 and 10). The base end of a cylinder 398 in the pneumatic pressure cylinder mechanism constituting the positioning means 378 is pivotably linked to the supporting member 396 by means of a substantially vertically extending linking pin 400. Thus, when the pneumatic pressure cylinder mechanism constituting the positioning means 378 is contracted, the receiving member 376 is pivoted about the pin 384. When the pneumatic pressure cylinder mechanism is contracted to pivot the receiving member 376 in the direction shown by an arrow 402 and hold it at its non-operating position shown by a solid line in FIG. 17, one side surface of the receiving member 376 abuts against a first stop piece 404 mounted on the receiving stand 380 whereby further pivoting of the receiving member 376 in the direction shown by the arrow 402 is hampered. When the pneumatic cylinder mechanism is contracted to pivot the receiving member 375 in the direction shown by an arrow 406 and hold it at its operating position shown by a two-dot chain line in FIG. 17, the other side surface of the receiving member 376 abuts against a second stop piece 408 mounted on the receiving stand 380 whereby further pivoting of the receiving member 376 in the direction shown by the arrow 406 is hampered.

Figure 11:
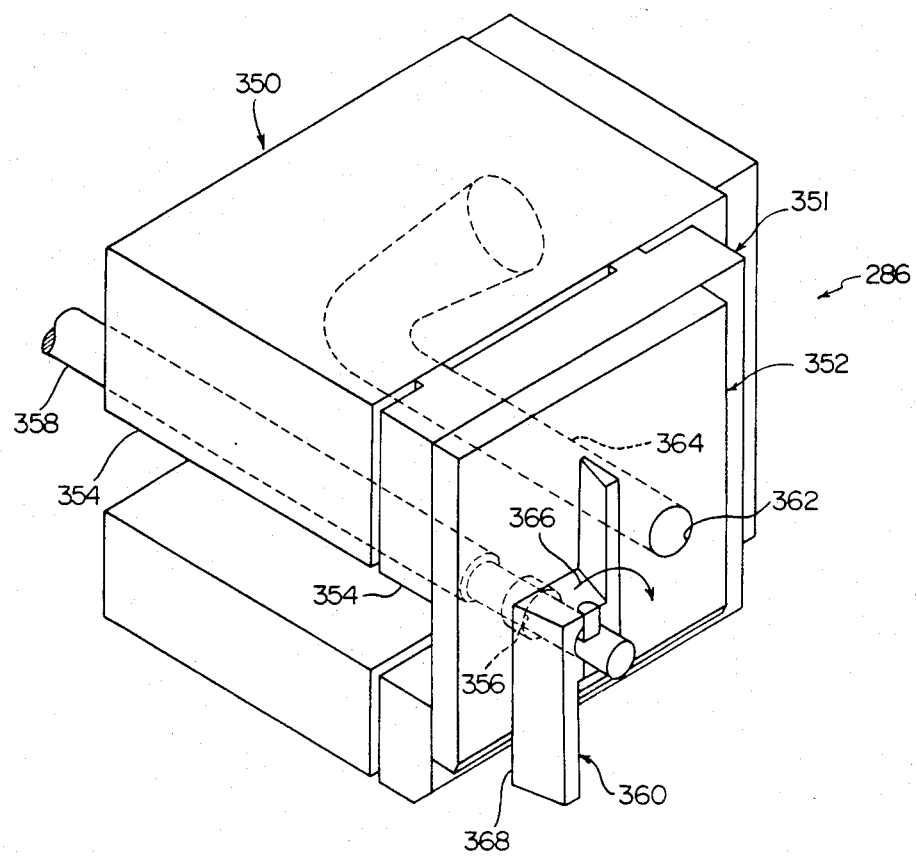
FIG. 11 is a partial perspective view showing a die head in the material feed means shown in FIG. 9.

As stated above mainly with reference to FIG. 11, the plastic material 278 extruded from the extrusion opening 362 of the die head 286 and cut by the rotating cutting blade 360 leaves the rotating cutting blade 360 and is dropped toward the die member 240 of the lower die assembly 74 of the molding die means 14. When the receiving member 376 is held at the aforesaid operating position, the front end portion of the receiving member 376 is located within a path of dropping of the plastic material 278. Hence, the plastic material 278 drops onto the receiving member 376, and the supplying of the plastic material 278 to the die member 240 of the lower die assembly 74 is hampered. On the other hand, when the receiving member 376 is held at its non-operating position, it is located away from the path of dropping of the plastic material 278, and therefore, the plastic material 278 drops onto the molding die member 240.

A gas stream jetting means 410 is provided at the front end of the receiving member 376. The gas jetting means 410 includes a block 412 fixed to the front end of the receiving member 376. The block 412 has formed therein a flow passage 414 extending laterally from one end of the block 412 over a required length, and a plurality of laterally spaced gas jetting holes 416 extending rearwardly from the flow passage 414 and opening to the rear surface of the block 412 (instead of the plurality of gas jetting holes 416, one or more elongate slits may be formed). The flow passage 414 is connected to a gas supply source (not shown) through a line (not shown) including a control valve. When the receiving member 376 is positioned at the operating position, the control valve is opened to supply a gas which may be compressed air to the flow passage 414 from the gas supply source. The gas is then jetted out from the gas jetting holes 416. The gas streams jetted from the gas jetting holes act on the plastic material 278 which has dropped onto the front end portion of the receiving member 376 and forces it toward the rear end portion of the receiving member 376.

Figure 17:
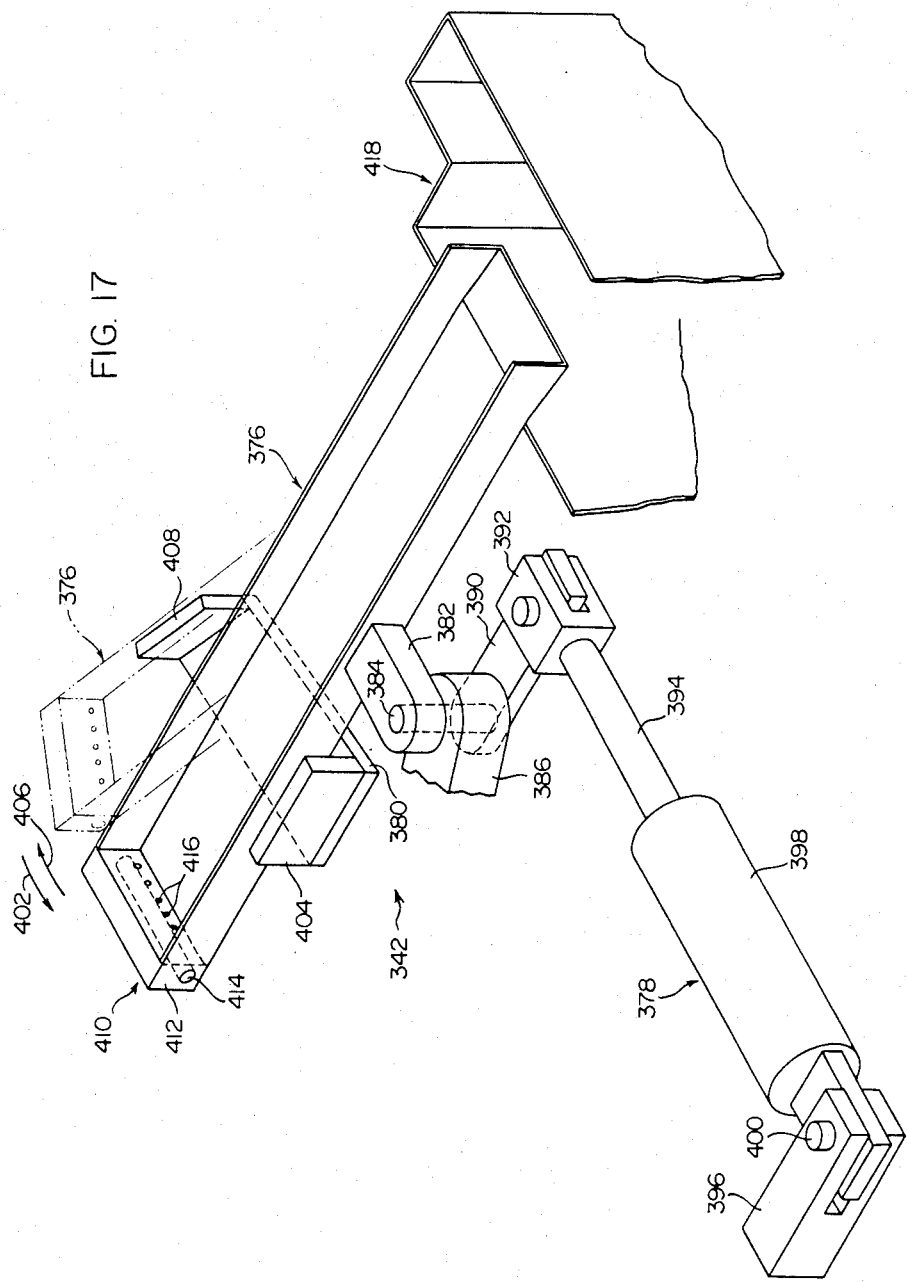
FIG. 17 is a partial perspective view showing a feed hampering means in the material feed means shown in FIG. 9.

With reference to FIG. 17 as well as FIGS. 9 and 10, a passage means 418 composed of a duct is provided in the illustrated embodiment in relation to the receiving member 376. As shown in FIG. 10, the passage means 418 is detachably mounted on the supporting frame 292 by detachably linking securing bracket 421 fixed to the inside surface of the upper end portion of the passage means 418 to a securing bracket 419 fixed to the under surface of the supporting frame 292, and can therefore be moved incident to the movement of the supporting frame 292. The inlet formed at the upper end of the passage means 418 is positioned correspondingly to the rear end of the receiving member 376. The lower end of the passage means 418 is caused to communicate with a stationary resin reservoir tank 420. The plastic material 278 forced to the rear end portion of the receiving member 376 by the aforesaid gas streams is fed to the inlet of the passage means 418 from the receiving member 376, passed through the passage means 418, and enters the resin reservoir tank 420. In the resin reservoir tank 420, the plastic material 278 is cooled and hardened by water placed in it. In order for the molten plastic material 278 to move well through the passage means 418 without adhering to its inner wall, it is preferable to supply water to the inlet of the passage means 418 by a suitable means (not shown) thereby forming a water stream flowing from the inlet toward the outlet, and to carry the plastic material 278 on the water stream through the passage means 418.

The following fact should be noted with regard to the feed hampering means 342. When a predetermined period of time elapses from the starting of the operation of the extruder 282, the action of the extruder 282 is not stable, and the amount and temperature of the plastic material 278 extruded from the extrusion opening 362 do not reach required values. It will be readily understood that if the plastic material 278 is fed to the molding die means 14 at this time and molded, the resulting molded product becomes poor in quality and adverse effects are likely to be exerted on the molding die means 14. In the illustrated embodiment, however, before the action of the extruder 282 is sufficiently stabilized, the receiving member 376 is held at its operating position to check the supplying of the plastic material 278 to the molding die means 14. Consequently, the production of poor molded products can be prevented and adverse effects on the molding die means 14 can be accurately avoided. Furthermore, when the action of the extruder 282 is stable but it is desired to stop the feeding of the plastic material 278 to the molding die means 14 by some reason, for example owing to some trouble that has occurred in the rotary compression molding means 2, the feeding of the plastic material 278 to the molding die means 14 can be hampered by holding the receiving member 376 at its operating position without the need to stop the operation of the extruder (once the operation of the extruder 282 is stopped, a waiting time is required upon resumption of its operation until the action of the extruder 282 becomes stable).

Now, with reference to FIGS. 9 and 18, the cutting means 348 will be described in detail. Bearing blocks 422 and 424 spaced from each other in the front-rear direction (the left-right direction in FIG. 18) are fixed to the supporting frame 292. The rotating shaft 358 of the cutting means 348 is mounted by means of these bearing blocks 422 and 424 such that it can rotate freely and move freely in the front-rear direction over some distance. Specifically, with reference to FIG. 18, a circular hole 426 extending in the front-rear direction is formed in the bearing block 422, and a bearing 428 is fixed within the circular hole 426. A cylindrical sleeve 430 is rotatably mounted by the bearing 428. The rotating shaft 358 extends through the sleeve 430. The rotating shaft 358 can freely move in the front-rear direction with respect to the sleeve 430, but is kept from rotating relative to the sleeve 430 by means of a key 432. A circular hole 434 extending in the front rear direction is formed in the bearing block 424, and a bearing 436 is fixed to the peripheral surface of the rotating shaft 358 extending through the hole 434. A member 438 is fixed to the peripheral surface of the bearing 436. The member 438 has a cylindrical peripheral surface having an outside diameter corresponding to the inside diameter of the hole 434 and is received within the hole 434 for free sliding in the front-rear direction. A plug member 423 having a hole 440 through which the rotating shaft 358 extends is threadably secured to the front end portion of the hole 434. A spring means 425 which may be a compression coil spring is disposed between the rear end surface of the plug member 423 and the front end surface of the member 438. The spring means 425 elastically biases the member 438 rearwardly (to the left in FIG. 18) and therefore the rotating shaft 358 rearwardly. Consequently it presses the rotating cutting blade 360 secured to the front end of the rotating shaft 358 elastically against the surface of the die plate 352 in the die head 286.

A plug member 429 having a hole 427 through which the rotating shaft 358 extends is also threadably secured to the rear end portion of the hole 434 formed in the bearing block 424. A disc-like movable member 433 having a hole 431 through which the rotating shaft 358 extends is placed within the hole 434 and between the plug member 429 and the bearing 436 fixed to the rotating shaft 358 so that the movable member 433 can slide freely in the front-rear direction (the left-right direction in FIG. 18). The movable member 433 constitutes a shaft moving means for moving the rotating shaft 358 slightly forwardly (to the right in FIG. 18) against the elastic biasing action of the spring means 425. With reference to FIGS. 18 and 19, a guide slot 435 is formed in the upper wall portion of the bearing block 424, and a projecting pin 437 projecting via the guide slot 435 is fixed to the movable member 433. As shown in FIG. 19, the guide slot 435 has a first engaging portion 435A and a second engaging portion 435B spaced from each other in the axial direction of the rotating shaft 358 and extending substantially perpendicularly to the axis of the rotating shaft 358, and an inclined portion 435C extending between the first and second engaging portions 435A and 435B. When the projecting pin 437 fixed to the movable member 433 is positioned within the first engaging portion 435A of the guide slot 435, the movable member 433 is held at a non-operating position shown in FIG. 18. In other words, the movable member 433 is positioned rearwardly of, and apart by some distance from, the bearing 436 fixed to the rotating shaft 358. When the projecting pin 437 is grasped and moved from the first engaging portion 435A to the second engaging portion 435B through the inclined portion 435C as shown by a two-dot chain line in FIG. 19, the movable member 433 is rotated over some angular range and moved forwardly (to the right in FIG. 18) a predetermined distance whereby it is held at the operating position. During this forward movement of the movable member 433, the movable member 433 abuts against the rear end surface of the bearing 436, and consequently, the bearing 436, and therefore the rotating shaft 358, are moved forwardly against the elastic biasing action of the spring means 425. Since the second engaging portion 435B of the guide slot 433 extends substantially perpendicularly to the axis of the rotating shaft 358, the movable member 433 is not moved rearwardly from the operating position by the elastic biasing action of the spring member 425 but held at its operating position. Accordingly, the rotating shaft 358 is held at an advanced position slightly forwardly of the position shown in FIG. 18. When the rotating shaft 358 is held at the advanced position, the rotating cutting blade 360 mounted on the front end of the rotating shaft 358 is moved away slightly forwardly from the surface of the die plate 352 in the die head 286. Thus, the rotating blade 360 can be easily detached from, and mounted on, the front end of the rotating shaft 358 for inspection, repair or replacement. When the projecting pin 437 fixed to the movable member 433 is grasped and returned from the second engaging portion 435B to the first engaging portion 435A through the inclined portion 435C, the movable member 433 is moved rearwardly to its non-operating position shown in FIG. 18, and the rotating shaft 358 is moved rearwardly by the elastic biasing action of the spring means 425 and the rotating cutting blade 360 secured to the front end of the rotating shaft 358 is elastically pressed against the surface of the die plate 352 of the die head 286.

As can be easily understood by referring to FIG. 11, to cut the plastic material 278 extruded from the extrusion opening 362 formed in the die plate 352 of the die head 286 sufficiently well by the rotating cutting blade 360, it is important that the cutting edge 368 of the rotating cutting blade 360 should be in sufficiently good contact with the surface of the die plate 352. To meet this requirement accurately, a unique method of mounting the rotating cutting blade 360 to the forward end portion of the rotating shaft 358 is employed in the illustrated cutting means 348 in addition to elastically biasing the rotating shaft 358 rearwardly by the spring means 440 and pressing the cutting blade 360 elastically against the surface of the die plate 352.

Figure 20:
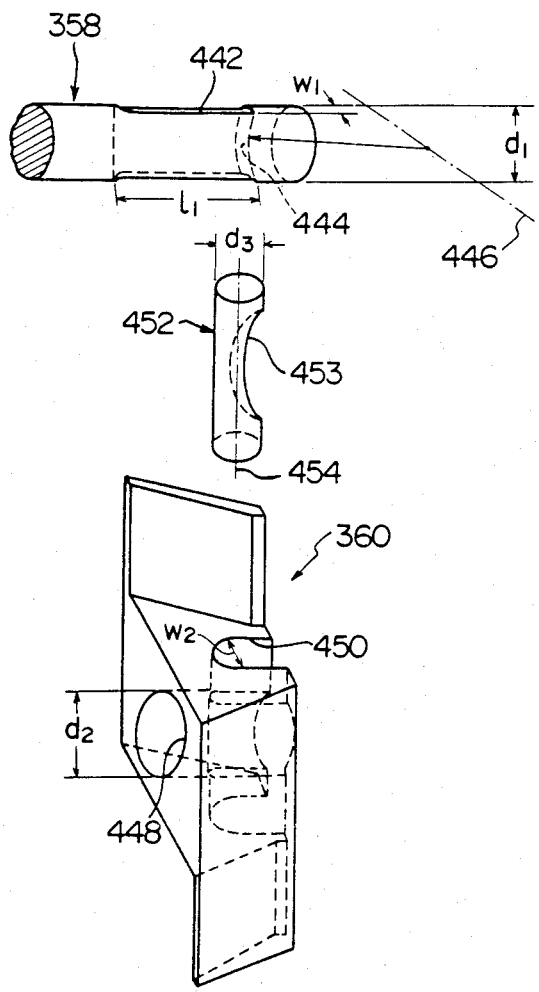
FIG. 20 is an exploded perspective view showing the relation between a rotating shaft and a rotary cutting blade in the cutting means shown in FIG. 18.

With reference to FIG. 20, a through-hole 442 is formed in the forward end portion of the rotating shaft 358. The through-hole 422 has a predetermined widthwise dimension $w_1$ and a sufficiently large axial dimension $l_1$ than the widthwise dimension $w_1$. A front wall 444 of the through-hole 442 is an arcuate raised wall having an axis 446 as a center. A shaft inserting hole 448 extending axially of the rotating shaft 358 is formed centrally in the rotating cutting blade 360. The inside diameter $d_2$ of the shaft inserting hole 448 is slightly larger than the outside diameter $d_1$ of the forward end portion of the rotating shaft 358. A pin-receiving hole 450 is also formed in the front surface of the rotating cutting blade 360. The pin-receiving hole 450 extends substantially perpendicularly to the shaft-inserting hole 448 and is opened forwardly. The widthwise dimension $w_2$ (therefore, the inside diameter of a semicircular portion in the rear part) of the pin-receiving hole 450 may be substantially equal to the widthwise dimension $w_1$ of the through-hole 442. The rotating cutting blade 360 is mounted on the forward end portion of the rotating shaft 358 by using a pin 452. The pin 452 may have an outside diameter $d_3$ substantially equal to the widthwise dimension $w_1$ of the through-hole 442 and therefore to the widthwise dimension $w_2$ of the pin receiving hole 450. An arcuate depressed portion 453 corresponding to the arcuate raised front wall 444 of the through-hole 442 is formed in the front surface of the pin 452. If desired, the front wall 444 of the through-hole 442 may be formed in an arcuate depression, and a corresponding arcuate raised portion may be formed in the front surface of the pin 452.

Specifically, the mounting of the rotating cutting blade 360 on the forward end portion of the rotating shaft 358 is carried out in the following manner. First of all, the forward end portion of the rotating shaft 358 is inserted into the shaft inserting hole 448 of the rotating cutting blade 360. Then, the pin 452 is inserted into the through-hole 442 formed in the rotating shaft 358 and the pin receiving hole 450 formed in the rotating cutting blade 360. As a result, the rotating shaft 358 is elastically biased axially rearwardly by the spring means 440, whereas the axially rearward movement of the cutting blade 360 is restricted by the pressing of the cutting blade 360 against the die plate 352. Hence, the arcuate depressed portion 453 formed in the front surface of the pin 452 is engaged with the arcuate raised front wall 444 of the through-hole 442 formed in the rotating shaft 358, and the rear surface of the pin 452 is engaged with the rear wall of the pin receiving hole 450 formed in the rotating cutting blade 360. As a result, the rotating shaft 358, the pin 452 and the rotating cutting blade 360 are held in the desired combined state.

The following facts should be noted with regard to the aforesaid mounting method. Firstly, since the inside diameter $d_2$ of the shaft inserting hole 448 formed in the cutting blade 360 is slightly larger than the outside diameter $d_1$ of the forward end portion of the rotating shaft 358, the rotating cutting blade 360 can freely pivot relative to the rotating shaft 358 and the pin 452 over a predetermined angular range about the axis 454 of the pin 452 as a center (this angular range is defined by the difference between the inside diameter $d_2$ and the outside diameter $d_1$). Secondly, in addition to the fact that the inside diameter $d_2$ of the shaft inserting hole 448 is slightly larger than the outside diameter $d_1$ of the forward end portion of the rotating shaft 358, the front wall 444 of the through-hole 442 formed in the rotating shaft 358 and the depression 453 formed in the front surface of the pin 452 are correspondingly in an arcuate shape, and the axial dimension $l_1$ of the through-hole 442 is sufficiently larger than the outside diameter $d_3$ of the pin 452. Accordingly, the pin 452 and the cutting blade 360 can freely pivot relative to the rotating shaft 358 over a predetermined angular range (defined by the difference between the inside diameter $d_2$ and the outside diameter $d_1$) about the axis 446 (i.e., the axis of the arcuate front wall 444 of the through-hole 442) as a center. Thus, the rotating cutting blade 360 is free to pivot relative to the rotating shaft 358 about two axes perpendicular to each other and also to the axial direction of the rotating shaft 358, namely the axes 454 and 446. Accordingly, if the surface of the die plate 352 is sufficiently flat and the cutting edge 368 of the cutting blade 360 is sufficiently straight, the cutting edge 368 is kept in sufficiently good contact with the surface of the die plate 352 irrespective of whether there is an error in assembling or production (for example, when the rotating shaft 358 is not positioned perpendicularly to the surface of the die plate 352 with a sufficiently high precision).

As stated hereinabove with reference to FIG. 11, the rotating shaft 358 of the cutting means 348 extends through the cut portion 354 formed in the die block 350 of the die head 286. The extrusion flow passage 364 is formed in the die block 350, and the molten plastic material 278 flows through the extrusion flow passage 364. Hence, the die block 350 attains a considerably high temperature, and owing to this, the rotating shaft 358, particularly its front portion, tends to attain a considerably high temperature. Such considerably high temperatures adversely affect the shaft supporting structure of the rotating shaft 358. At the same time, the heat is transmitted from the rotating shaft to the cutting blade 360, and the cutting blade 360 may be exposed to unacceptably high temperatures. To solve this problem, a cooling means is annexed to the rotating shaft 358 of the cutting means 348 in the illustrated embodiment.

Again, with reference to FIG. 18, the rotating shaft 358 has formed therein a hole 456 extending axially from its rear end to the vicinity of its forward end. On the other hand, a cooling medium manifold 457 located rearwardly of the rotating shaft 358 is placed on the supporting frame 292 so that it can freely move in the front-rear direction (the left-right direction in FIG. 18). A projecting linking portion 458 is formed in the front end of the cooling medium manifold 457 and connected for rotation relative to each other to the rear end portion of the hole 456 in the rotating shaft 358 by means of a suitable linking means. An introduction chamber 460 and a discharge chamber 462 are defined within the cooling medium manifold 457. The discharge chamber 462 communicates with the hole 456 in the rotating shaft 358 through a hole (not shown) formed in the projecting linking portion 458. To the introduction chamber 460 is connected the rear end of a pipe 465 extending through a hole (not shown) formed in the projecting linking portion 458 and the hole 456 formed in the rotating shaft 358. The introduction chamber 460 is connected to a supply source (not shown) of a cooling medium, which may be water at room temperature or cold water, via an introduction pipe 469 which extends downwardly through an opening 467 formed in the supporting frame 292. A discharge pipe 471 extending downwardly through the opening 467 formed in the supporting frame 292 is connected to the discharge chamber 462. Accordingly, the cooling medium supplied from the supply source (not shown) is intruduced into the introduction chamber 460 from the introduction pipe 469, passed through the pipe 465, and flows into the hole 456 formed in the rotating shaft 358 near its front end portion. Thereafter, the cooling medium flows rearwardly within the hole 456 and is discharged through the discharge pipe 471. The rotating shaft 358 is properly cooled by the aforesaid flowing of the cooling medium within the rotating shaft 358.

With reference to FIG. 9, the rotating shaft 358 of the cutting means 348 is drivingly connected to the driving source 52 (which functions both as a driving source for the rotary compression molding means 2 and a driving source for the cutting means 348 in the material feed means 4) through a drivingly connecting means including a power transmission system described below. Downwardly extending supporting walls 464 and 466 spaced from each other in the front-rear direction (the left-right direction in FIG. 9) are provided on the under surface of the supporting frame 292, and a power transmission shaft 468 is rotatably mounted across the supporting walls 464 and 466. A timing pulley 470 is fixed to the front end portion (the right end portion in FIG. 9) of the power transmission shaft 468. On the other hand, a timing pulley 472 is fixed to the sleeve 430 (FIG. 18) mounted on the rotating shaft 358. An endless timing belt 476 extending through an opening 474 formed in the supporting frame 292 is wrapped about the timing pulleys 470 and 472. As a result, the rotating shaft 358 is drivingly connected to the power transmission shaft 468. A first rotating angular position adjusting mechanism shown generally at 478 and a second rotating angular position adjusting mechanism shown generally at 480 are mounted on the upper surface of the horizontal base plate 316 in the stationary base station 312 (the first and second rotating angular position adjusting mechanisms 478 and 480 will be described in detail hereinafter). A non-uniform speed rotating mechanism shown generally at 482 (which will be described in detail hereinafter) is mounted on the under surface of the horizontal base plate 316. A timing pulley 486 is fixed to the output shaft 484 of the first angular position adjusting mechanism 478, and a timing pulley 488 is attached to the rear end portion (the left end portion in FIG. 9) of the power transmission shaft 468. The timing pulley 488 is mounted on the power transmission shaft 468 so as to rotate as a unit with the power transmission shaft 468. The power transmission shaft 468, however, is adapted to move relative to the timing pulley 488 in the front-rear direction (the left-right direction in FIG. 9). A supporting bracket 490 is fixed to the upper surface of a housing including the first rotating angular position adjusting mechanism 378, and the timing pulley 488 is connected to the supporting bracket 490 so that it is freely rotatable but cannot move in the front-rear direction. As a result, the movement of the timing pulley 488 in the front-rear direction is hampered. Thus, when the supporting frame 292 is moved in the front-rear direction (the left-right direction in FIG. 9) by the fluid pressure cylinder mechanisms 322, the power transmission shaft 468 and the timing pulley 470 fixed to its front end portion are moved in the front-rear direction, but the timing pulley 488 mounted on the rear end portion of the power transmission shaft 468 is not moved in the front-rear direction but held at the position shown in the drawing. An endless timing belt 492 is wrapped about the timing pulley 488 and the timing pulley 486, and consequently, the power transmission shaft 468 is drivingly connected to the output shaft 484 of the first rotating angular position adjusting mechanism 478. A timing pulley 496 is fixed to the input shaft 494 of the first rotating angular position adjusting mechanism 478, and a timing pulley 500 is fixed to the output shaft 498 of the non-uniform speed rotating mechanism 482. An endless timing belt 502 extending through an opening 473 formed in the horizontal base plate 316 is wrapped about the timing pulleys 496 and 500. As a result, the input shaft 494 of the first rotating angular position adjusting mechanism 478 is drivingly connected to the output shaft 498 of the non-uniform speed rotating mechanism 482. A timing pulley 506 is fixed to the input shaft 504 of the non-uniform speed rotating mechanism 482, and a timing pulley 510 is fixed to the output shaft 508 of the second rotating angular position adjusting mechanism 480. An endless timing belt 514 extending through an opening 512 formed in the horizontal base plate 316 is wrapped about the timing pulleys 506 and 510. As a result, the input shaft 504 of the non-uniform speed rotating mechanism 482 is drivingly connected to the output shaft 508 of the second rotating angular position adjusting mechanism 480. The input shaft 516 of the second rotating angular position adjusting mechanism 480 is drivingly connected to the driving source 52 through a suitable driving system (not shown). Thus, the rotation of the driving source 52 is transmitted to the rotating shaft 358 through the second rotating angular position adjusting mechanism 480, the non-uniform speed rotating mechanism 482, the first rotating angular position adjusting mechanism 478 and the power transmission shaft 468 to rotate the rotating shaft 358 and the cutting blade 360 mounted on it.

As shown in FIG. 9, the non-uniform speed rotating mechanism 482 has a housing 475 fixed to the under surface of the horizontal base plate 316. The output shaft 498 is rotatably mounted on the housing 475 by means of a bearing 477, and the input shaft 504 is also rotatably mounted on the housing 475 by means of a bearing 479. An elliptical gear 481 is fixed to the output shaft 498, and an elliptical gear 483, to the input shaft 504. The elliptical gears 481 and 483 which mesh with each other convert the uniform speed rotation transmitted to the input shaft 504 into non-uniform speed rotation and transmit it to the output shaft 498.

Figure 21:
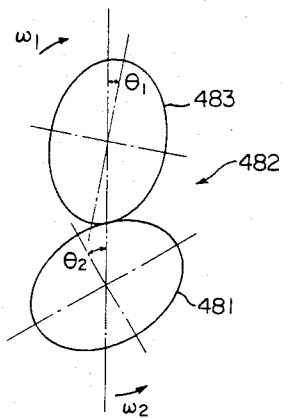
FIG. 21 is a simplified view showing a non-uniform speed rotating mechanism in a drivingly connecting means in the cutting means shown in FIG. 9.

With reference to FIGS. 9 and 21, the angular velocity $\omega_2$ of the elliptical gear 481 will be considered with regard to the degree of flatnesses, $e$, of the elliptical gears 481 and 483 and the angular velocity $\omega_1$ of the elliptical gear 483. The rotating angle $\theta_2$ of the elliptical gear 481 is as follows with respect to the rotating angle $\theta_1$ of the elliptical gear 483.

$$\theta_2 = \tfrac{1}{2} \cos^{-1}\left(\frac{k + \cos 2\theta_1}{1 + k\cos 2\theta_1}\right)$$

where $k = \dfrac{2e}{1 + e^2}$

The angular velocity $\omega_2$ of the elliptical gear 481 is given by the following equation with respect to the uniform angular velocity $\omega_1$ of the elliptical gear 483.

$$\omega_2 = \omega_1 \cdot \frac{\sqrt{1-k^2}}{1 + k\cos 2\theta_1}$$

Hence, the ratio of the angular velocity $\omega_2$ of the elliptical gear 481 to the uniform velocity $\omega_1$ of the elliptical gear 483, $\omega_2/\omega_1$, is given by the following equation.

$$\frac{\omega_2}{\omega_1} = \frac{\sqrt{1-k^2}}{1 + k\cos 2\theta_1}$$

Figure 22:
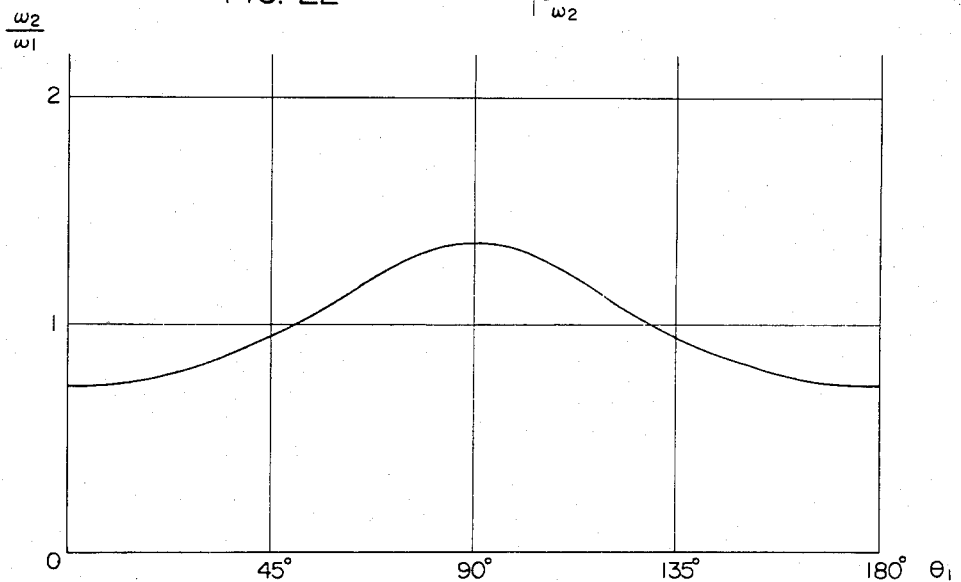
FIG. 22 is a diagram illustrating the non-uniform speed rotating condition of an output shaft in the non-uniform rotating mechanism in FIG. 21.

This is illustrated in FIG. 22. Thus, the rotating shaft 358 and the rotating cutting blade 360 mounted on it are rotated at a non-uniform angular velocity as exemplified in FIG. 22.

The following fact should be noted with regard to the non-uniform speed rotating mechanism 482 described above. It is necessary that the rotating cutting blade 360 should cut the plastic material 278 extruded from the extrusion opening 362 (see FIG. 11) of the extruding means 280 in synchronism with the rotation of the molding die means 14 (see FIG. 1) in the rotary compression molding means 2. Hence, the time required for the rotating cutting blade 360 to rotate through one turn is determined univocally by the rotating speed of the molding die means 14 in the rotating compression molding means 2. Experiences of the present inventors show, on the other hand, that to cut the plastic material 278 extruded from the extrusion opening 362 in a required manner, it is important to adjust the angular velocity $\omega_2$ of the rotating cutting blade 360 at the time of crossing the extrusion opening 362 to a predetermined value, usually a sufficiently large value. It will be understood from FIG. 22 however that according to the non-uniform speed rotating mechanism 482 described above, the angular velocity $\omega_2$ of the rotating cutting blade 360 at the time of crossing the extrusion opening 362 can be present at a suitable value from min $\omega_2$ to max $\omega_2$, usually at max $\omega_2$ without varying the time required for one revolution of the rotating cutting blade 360, and therefore, without destroying the synchronism between the rotation of the molding die means 14 and the cutting of the plastic material 278, the angular velocity $\omega_2$ of the cutting blade 360 at the time of crossing the extrusion opening 362 can be adjusted to a required value.

If the angular velocity $\omega_2$ of the rotating cutting blade at the time of crossing the extrusion opening 362 is set at a relatively large value (usually, at max $\omega_2$) and is gradually decreased immediately after cutting the plastic material 278 across the extrusion opening 362, the following advantage can be obtained. When the angular velocity $\omega_2$ of the rotating cutting blade is decreased immediately after cutting the plastic material 278, the cut plastic material 278 tends to keep moving by inertia at an angular velocity corresponding to the angular velocity (usualy max $\omega_2$) of the rotating cutting blade 360, whereas the movement of the rotating cutting blade 360 gradually decreases and thereby the separation of the cut plastic material from the rotating cutting blade 360 is accelerated. If desired, two or more pairs of elliptical gears may be used in order to increase the rate of change in the velocity of the rotating cutting blade 360.

In the illustrated embodiment, the rotation of the molding die means 14 in the rotary compression molding means 2 and the cutting of the plastic material 278 by the cutting blade 360 are kept in synchronism in the required manner by properly adjusting the rotating angular position of the output shaft 508 relative to the input shaft 516 by the second rotating angular position adjusting mechanism 480. Furthermore, the angular velocity $\omega_2$ of the rotating cutting blade 360 at the time of crossing the extrusion opening 362 is preset at a suitable value between min $\omega_2$ and max $\omega_2$ by properly adjusting the rotating angular position of the output shaft 484 relative to the input shaft 494 by the first rotating angular position adjusting mechanism 478. Desirably, in view, for example, of the ease of the adjusting operation, the first and second rotating angular position adjusting mechanisms 478 and 480 are desirably of such a type that the rotating angular position of the output shaft relative to the input shaft can be adjusted without stopping the rotation of the input shaft and the output shaft.

The first rotating angular position adjusting mechanism 478 will be described in detail with reference to FIG. 23. The illustrated first rotating angular position adjusting mechanism 478 comprises a housing, or a main block, 491 having an accommodating space opened in the front-rear direction (the left-right direction in FIG. 23) and end walls 493 and 495 fixed respectively to both end surfaces of the main block 491. Openings which are in alignment with each other in the front-rear direction are formed respectively in the end walls 493 and 495, and bearings 497 and 499 are disposed in these openings. A supporting block 503 having a hole 501 extending in the front-rear direction is fixed to the inner surface of the end wall 493. The front end portion of the input shaft 494 is rotatably supported on the bearing 497, extends through the hole 501 of the supporting block 503, and projects forwardly beyond the hole 501. The rear end portion of the output shaft 484 is rotatably supported on the bearing 499 and projects rearwardly. An input gear 505 is fixed to the rear end of the input shaft 494, and an output gear 507 is fixed to the front end of the output shaft 484. On the other hand, a rotating member 511 is rotatably mounted on the periphery of the supporting block 503 via a busing 509. As will be made clear from a description given hereinafter the rotation of the rotating member 511 is normally restrained, and it is rotated by the operator only when the rotating angular position of the output shaft 484 relative to the input shaft 494 is adjusted. A short shaft 513 projecting forwardly is set firmly in the rotating member 511, and an input side power transmission gear 515 is rotatably mounted on the short shaft 513. The input side power transmission gear 515 is engaged with the input gear 505. In the end wall 495 is set firmly a short shaft 517 projecting rearwardly from its inner surface, and an output side power transmission gear 520 is rotatably mounted on the short shaft 517. The output side power transmission gear 520 is engaged with the output gear 507. A relatively large internal gear 522 which surrounds the input side power transmission gear 515 and the output side power transmission gear 520 is provided. A bearing 524 is interposed between the peripheral surface of the internal gear 522 and the inner circumferential surface of the main block 491, thereby permitting rotation of the internal gear 522 relative to the main block 491. The teeth formed on the inner circumferential surface of the internal gear 522 mesh both with the input side power transmission gear 515 and the output side power transmission gear 520.

Figure 23:
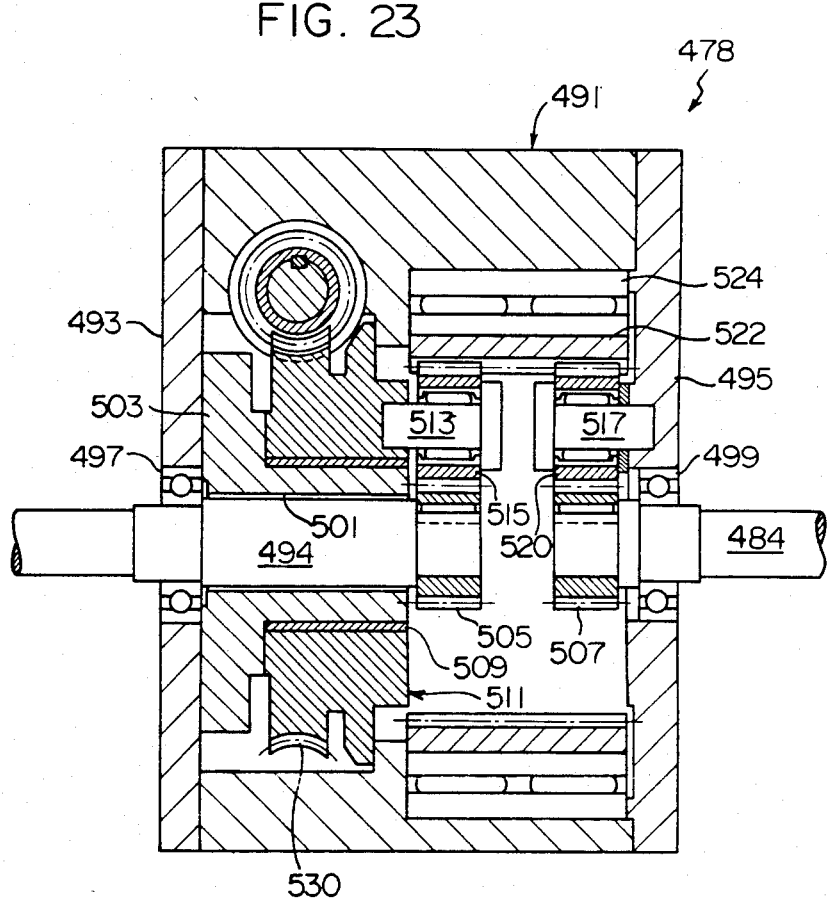
FIG. 23 is a sectional view in the axial direction of a rotating angular position adjusting mechanism in the drivingly connecting means of the cutting means shown in FIG. 9.
Figure 24:
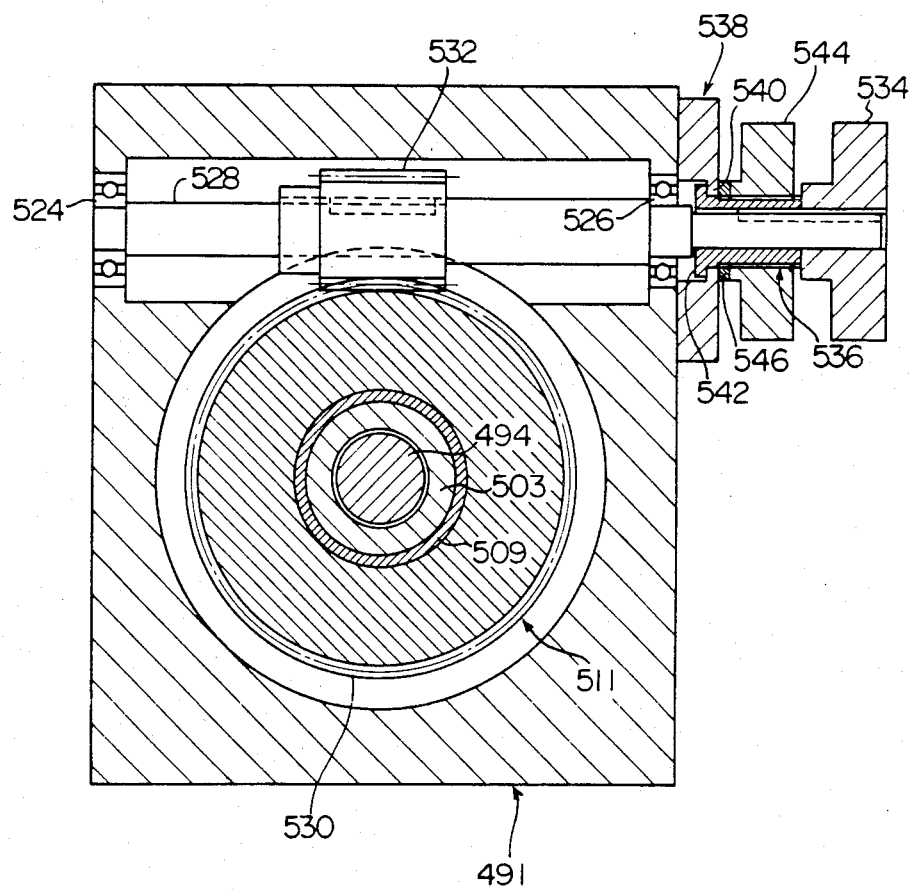
FIG. 24 is a cross sectional view of the rotating angular position adjusting mechanism shown in FIG. 23.

With reference to FIGS. 23 and 24, a shaft 528 extending substantially at right angles to the input shaft 494 and the output shaft 484 is rotatably mounted on the main block 491 by means of bearings 524 and 526. Worm teeth 530 are formed on the peripheral surface of the rotating member 511. A worm 532 in mesh with the worm teeth 530 is fixed to the shaft 528. As shown in FIG. 24, one end of the shaft 528 projects from the main block 491, and a manually operating knob 534 is secured to the projecting end portion of the shaft 528. A nearly cylindrical member 536 is also attached to this projecting end portion. The member 536 is mounted on the shaft 528 such that it can move axially relative to the shaft 528, but can rotate as a unit with the shaft 528. A nearly annular member 538 is fixed to the main block 491, and an inwardly directed flange 540 protruding diametrically inwardly is formed on the outside end portion of the member 538, and correspondingly to it, an outwardly directed flange 542 protruding diametrically outwardly is formed in the inside end portion of the member 536. An external thread is formed on the peripheral surface of the member 536, and a lock nut 544 is secured threadably to the external thread. A washer 546 is disposed between the lock nut 544 and the member 538. Turning the lock nut 544 in a predetermined direction results in its movement to the left in FIG. 24 and causes the member 536 to move to the right in FIG. 24. As a result, the internally directed flange 540 of the member 538 is held between the lock nut 544 and the outwardly directed flange 542 of the member 536. Thus, the rotation of the member 536 and therefore of the shaft 528 is restrained. When the rotation of the shaft 528 is restrained, the rotation of the rotating member 511 is also restrained owing to the presence of the worm 532 fixed to the shaft 528 and the worm teeth 530 in mesh with it. When the lock nut 544 is turned in an opposite direction, it is moved to the right in FIG. 24 and the member 536 is moved to the left in FIG. 24. As a result, holding of the inwardly directed flange 540 of the member 538 between the outwardly directed flange 542 and the lock 544 is cancelled, and by turning the manually operating knob 534, the shaft 528 can be rotated.

The operation and advantage of the first rotating angular position adjusting mechanism 478 will be described below briefly. During a normal operation (when the rotating angular position of the output shaft 484 relative to the input shaft 494 is not adjusted), the rotation of the shaft 528 is restrained by the action of the lock nut 544, etc., and therefore, the rotation of the rotating member 511 is restrained. In this state, the rotation of the input shaft 494 is transmitted to the internal gear 522 via the input gear 505 and the input side power transmission gear 515, and the rotation of the internal gear 522 is transmitted to the output shaft 484 via the output side power transmission gear 520 and the output gear 507. Consequently, the output shaft 484 is rotated. Since in the illustrated embodiment, the input gear 505 and the output gear 507 have the same number of teeth (and therefore the input side power transmission gear 515 and the output side power transmission gear 520 have the same number of teeth), the output shaft 484 and the input shaft 494 are rotated at substantially the same angular velocity. If desired, a decelerating or accelerating function may also be given to the rotating angular position adjusting mechanism 478 by properly changing the number of teeth in the input gear 505, the output gear 507, the input side power transmission gear 515 and the output side power transmission gear 520.

When the rotating angular position of the output shaft 484 relative to the input shaft 494 is to be adjusted, the lock nut 544 is manipulated to cancel the restraining of the rotation of the shaft 528. The shaft 528 is then rotated by operating the manually operating knob 534. As a result, the rotating member 511 is rotated via the worm 532 and the worm teeth 530. The input side power transmission gear 515 rotating about the short shaft 513 is also revolved around the input gear 505. In response to this, the rotation of the internal gear 522 is temporarily accelerated or inhibited, and therefore, the rotation of the output side power transmission gear 520 and the output gear 507 is temporarily accelerated or inhibited. Consequently, the rotation of the output shaft 484 is temporarily accelerated or inhibited, and the rotating angular position of the output shaft 484 relative to the input shaft 494 is varied. The degree of variation in the rotating angular position of the output shaft 484 relative to the input shaft 494 can best be explained by the following example. Let us assume that the number of teeth of the input gear 501 is Za, the number of teeth in the input side power transmission gear 515 is Zb, the number of teeth of the output side power transmission gear 520 is Zc, the number of teeth of the output gear 507 is Zd, the number of teeth of the internal gear 522 is Ze, and Ze/3=Za=Zb=Zc=Zd. Then, the rotation accelerating or inhibiting angle no of the output shaft 484 with respect to the rotating angle ni (namely, the varying angle of the output shaft 484 relative to the input shaft 494) is given by the following equation.

$$no = \pm \frac{Za + Ze}{Zd} \cdot ni = \pm 4ni$$

(The negative or positive of no depends on the rotating direction of the rotating member 511.) Let the relation of the rotating angle (nm) of the shaft 528 to the rotating angle ni of the rotating member 511 be nm=ni/60, no is given by the following equation.

$$no = \pm 4ni = nm/15$$

Hence, when, for example, the shaft 528 is rotated through 30 degrees, the angular position of the output shaft 484 relative to the input shaft 494 is varied by 2 degrees (=30/15). Accordingly, the illustrated first rotation angular position adjusting mechanism 478 enables the rotating angular position of the output shaft 484 relative to the input shaft 494 to be properly adjusted without the need to stop the rotation of the input shaft 494 and the output shaft 484.

The second rotating angular position adjusting mechanism 490 for adjusting the rotating angular position of the output shaft 508 relative to the input shaft 516 may be of substantially the same type as the first rotating angular position adjusting mechanism 478 described above, and therefore, a detailed description of it will be omitted herein.

Article Carrying Means

Figure 25:
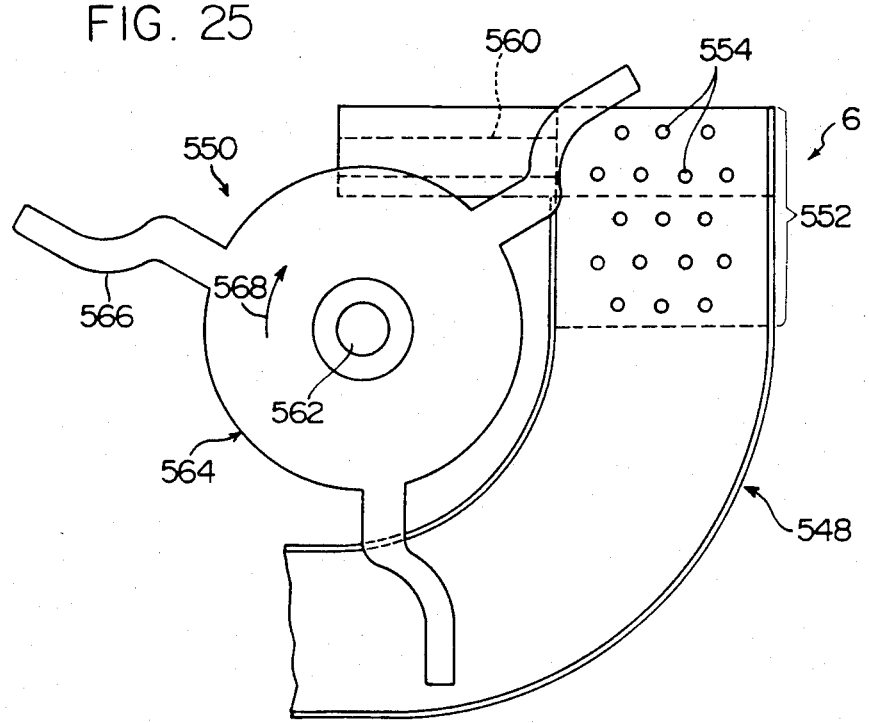
FIG. 25 is a partial top plan view showing an article carrying means in the compression molding apparatus shown in FIG. 1.
Figure 26:
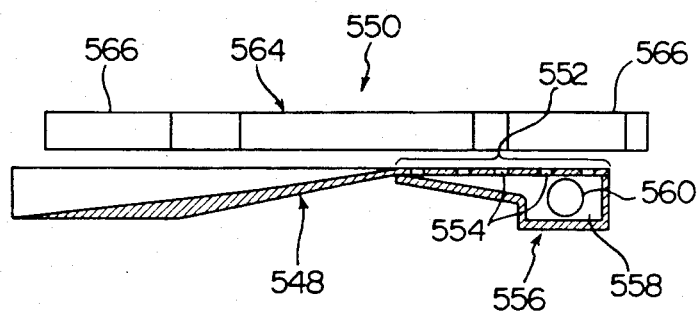
FIG. 26 is a partial sectional view of the article carrying means shown in FIG. 25.

The article carrying means 6 will be described. With reference to FIGS. 25 and 26, the illustrated article carrying means 6 has a carrying chute 548 and a rotating transfer mechanism 550.

The upstream end portion 552 of the carrying chute 548 supported in position by a suitable supporting structure (not shown) is positioned between the spaced upper die assembly 72 and lower die assembly 74 of the molding die means in the articel discharging zone D (see FIGS. 1 and 8-F also). A plurality of suction holes 554 are formed in the upstream end portion 552, and a sucking means 556 is disposed in relation to these sucking holes 554. The sucking means 556 in the illustrated embodiment includes a suction chamber 558 annexed to the under surface of the upstream end portion 552 of the chute 548. The suction chamber 558 is connected to a suitable suction source (not shown) such as a vacuum pump through a suction tube 560. Hence, air is sucked from the suction holes 554 through the suction chamber 558 and the suction tube 560. It will be readily understood from FIGS. 8-E and 8-F in conjunction with FIGS. 25 and 26 that air streams sucked from the suction holes 554 promote removing of the article, i.e. closure 252, from the upper die assembly 72 of the molding die means 14 and cause the closure 252 removed from the upper die assembly 72 and dropped onto the upstream end portion 552 of the chute 548 to adhere to it firmly, thereby preventing accidental tumbling of the closure 252.

The rotating transfer mechanism 550 is comprised of a substantially vertically extending rotating shaft 562 and a rotating member 564 mounted on the rotating shaft 562. The rotating member 564 has at least one arm (three arms 566 in the drawings) extending diametrically outwardly. The rotating shaft 562 is drivingly connected to a suitable rotary driving source such as an electric motor (this driving source may be the driving source 52 in the compression molding means 2), and the rotating shaft 562 and the rotating member 564 are rotated in the direction shown by an arrow 568 in FIG. 25. It will be readily appreciated from FIGS. 25 and 26 that when the rotating member 564 is rotated in the direction of arrow 568, the arms 566 act on the closure 252 present in the upstream end portion 552 of the chute 548 to move it downstream from the upstream end portion 552. The closure 252 so moved from the upstream end portion 252 of the chute 548 is carried to a suitable place (for example, a gathering place).

Whilst the invention has been described in detail with reference to preferred embodiments of the compression molding apparatus of the invention with reference to the accompanying drawings, it should be understood that the invention is not limited to these specific embodiments, and various changes and modifications are possible without departing from the scope of the invention.

What is claimed is:

1. A compression molding apparatus comprising
a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;
a material feed means for feeding a plastic material to said molding die means in said material charging means; and
an article carrying means for carrying the molded article from the molding die means in said article discharging zone,
wherein said material feed means comprises an extruding means for extruding a molten plastic material through an extrusion opening and a cutting means for cutting the plastic material extruded from the extrusion opening and feeding it to the molding die means; the cutting means comprises comprising a rotating cutting blade mounted for rotation across the extrusion opening, a driving source and drivingly connecting means for drivingly connecting the driving source to the rotating cutting blade; the drivingly connecting means including a non-uniform speed rotating mechanism for converting the uniform speed rotation of the driving source to a non-uniform speed rotation, and a rotating angular position adjusting mechanism in which the relative angular position between its input end drivingly connected to the output end of the non-uniform speed rotating mechanism and its output end drivingly connected to the rotating blade can be freely adjusted.

2. The apparatus of claim 1 wherein the non-uniform speed rotating mechanism comprises a pair of elliptical gears in mesh with each other.

3. The apparatus of claim 1 wherein the rotating angular position adjusting mechanism comprises an input gear fixed to an input shaft, an output gear fixed to an output shaft, a rotatable internal gear of a relatively large diameter surrounding the input gear and the output gear, a rotatable input side power transmission gear in mesh with the input gear and the internal gear, a rotatable output side power transmission gear in mesh with the output gear and the internal gear, and a mechanism for changing the angular position, around the input gear or the output gear, of at least one of the input side power transmission gear and the output side power transmission gear.

4. The apparatus of claim 1 wherein the rotating cutting blade is rotated at non-uniform speeds so that it attains the highest rotating speed within an angular range between an angular position at which its starts to cut the plastic material extruded from the extrusion opening and an angular position at which the cut plastic material leaves the rotating cutting blade.

5. A compression molding apparatus comprising
a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;

a material feed means for feeding a plastic material to said molding die means in said material charging means; and an article carrying means for carrying the molded article from the molding die means in said article discharging zone, wherein the material feed means includes an extruding means for extruding a molten plastic material through an extrusion opening open to a substantially flat surface and a cutting means for cutting the plastic material extruded from the extrusion opening and feeding it to the molding die means; the cutting means including a rotating shaft extending substantially perpendicularly to said flat surface to which the extrusion opening opens, a rotating cutting blade mounted on the rotating shaft and a driving source for rotating the rotating shaft; the rotating cutting blade is mounted on the rotating shaft so that it can pivot freely over at least some angular range about a first axis extending substantially perpendicularly to the rotating shaft and over at least some angular range about a second axis extending substantially perpendicularly to the first axis; and a spring means is provided for elastically biasing the rotating shaft in a direction to press the rotating cutting blade against said flat surface to which the extrusion opening opens, the rotating shaft extending beyond the flat surface to which the extrusion opening opens from behind said flat surface, the rotating cutting blade is mounted on the forward end of the rotating shaft, and the spring means elastically biases the rotating shaft rearwardly, the rotating shaft has formed therein a through-hole extending in the direction of the first axis, the rotating cutting blade has formed therein a shaft insertion hole extending axially of the rotating shaft and a pin receiving hole extending in the direction of the first axis and opened forwardly, and the rotating cutting blade is mounted on the rotating shaft by inserting the rotating shaft into the shaft insertion hole and then inserting a pin into the through-hole and the pin receiving hole, the inside diameter of the shaft insertion hole is larger than the outside diameter of the rotating shaft so that the rotating cutting blade can pivot about the first axis in alignment with the central axis of the pin, and the through-hole has a size larger than the outside diameter of the pin in the axial direction of the rotating shaft and substantially equal to the outside diameter of the pin in the direction of the second axis, the through-hole has a front wall of an arcuate depressed or raised shape having a center at the second axis, the front surface of the pin has formed therein an arcuate raised or depressed portion corresponding to the arcuate depressed or raised front wall whereby the pin and the rotating cutting blade can pivot about the second axis with respect to the rotating shaft.

6. A compression molding apparatus comprising a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;

a material feed means for feeding a plastic material to said molding die means in said material charging means; and an article carrying means for carrying the molded article from the molding die means in said article discharging zone, wherein the material feed means has an extruding means for extruding a molten plastic material through an extrusion opening open to a substantially flat surface, and a cutting means for cutting the plastic material extruded through the extrusion opening and feeding it to the molding die means;

the cutting means includes a rotating shaft extending substantially perpendicularly to the flat surface to which the extrusion opening opens, a rotating cutting blade mounted on the rotating shaft and a driving source for rotating the rotating shaft;

the rotating shaft is mounted axially movably, and there are provided a spring means for elastically biasing the rotating shaft in a direction to press it against the flat surface to which the extrusion opening opens, and a rotating shaft moving means for moving against the elastic biasing action of the spring means the rotating shaft in a direction in which the rotating cutting blade moves away from the flat surface to which the extrusion opening opens.

7. The apparatus of claim 6 wherein the rotating shaft moving means includes a contact surface formed in the rotating shaft and a movable member mounted for free movement between a non-operating position at which it is located away from the contact surface and an operating position spaced a predetermined direction from the non-operating position in a direction in which the rotating cutting blade moves away from the flat surface to which the extrusion opening opens; and when the movable member is moved to the operating position from the non-operating position, it abuts against the contact surface and moves the rotating shaft incident to its movement.

8. The apparatus of claim 7 wherein a projecting pin is provided in the movable member and a stationary member having a guide slot in which the projecting pin is inserted is disposed; the guide slot has a first engaging portion extending substantially perpendicularly to the axis of the rotating shaft, a second engaging portion spaced a predetermined distance from the first engaging portion axially of the rotating shaft and extending substantially perpendicularly to the axis of the rotating shaft and an inclined portion extending across the first and second engaging portions; and when the projecting pin is positioned at the first engaging portion, the movable member is held at the non-operating position, and when the projecting pin is moved to the second engaging portion from the first engaging portion via the inclined portion, the movable member is moved to the operating position from the non-operating position.

9. A compression molding apparatus comprising
a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;
a material feed means for feeding a plastic material to said molding die means in said material charging means; and
an article carrying means for carrying the molded article from the molding die means in said article discharging zone,
wherein the material feed means includes an extruding means for extruding a molten plastic material through an extrusion opening open to a surface and a cutting means for cutting the plastic material extruded from the extrusion opening and feeding it to the molding die means;
the cutting means includes a rotating shaft, a rotating cutting blade mounted on the forward end portion of the rotating shaft and disposed on said surface to which the extrusion opening opens, and a driving source for rotating the rotating shaft; and
a cooling medium flow passage is formed in at least the forward end portion of the rotating shaft so that at least the forward end portion of the rotating shaft is cooled by passing a cooling medium through the cooling medium flow passage.

10. The apparatus of claim 9 wherein the extruding means includes a die head having said extrusion opening and a resin flow passage communicating with the extrusion opening, and the rotating shaft of the cutting means extends from behind said surface forwardly beyond the surface to which the extrusion opening opens.

11. The apparatus of claim 10 wherein the die head has formed therein a cut portion or an opening portion through which the rotating shaft of the cutting means passes.

12. A compression molding apparatus comprising
a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;
a material feed means for feeding a plastic material to said molding die means in said material charging means; and
an article carrying means for carrying the molded article from the molding die means in said article discharging zone,
wherein the material feed means includes an extruding means for extruding a molten plastic material through an extrusion opening and a cutting means for cutting the plastic material extruded through the extrusion opening and feeding it to the molding die means;
the extruding means includes a die head to the surface of which said extrusion opening opens, and the cutting means includes a rotating cutting blade mounted so as to rotate across the extrusion opening and a driving means for rotating the rotating cutting blade whereby the plastic material extruded from the extrusion opening is cut by the rotating cutting blade and carried to the lower edge of said surface of the die head incident to the rotation of the rotating cutting blade; and
the die head has provided therein gas stream jetting means for jetting gas streams downwardly or forwardly from the lower surface of the die head thereby to prevent the plastic material carried to the lower edge of the surface of the die head from moving to the lower surface of the die head and to aid in its leaving from the rotating cutting blade so that the plastic material is dropped while drawing a required track fully stably.

13. The apparatus of claim 12 wherein the gas stream jetting means has gas stream jetting holes open to the lower end surface of the die head.

14. The apparatus of claim 13 wherein the forward end portion of the lower end surface of the die head is inclined upwardly in the forward direction.

15. The apparatus of claim 14 wherein the gas stream jetting holes are opened rearwardly of, and adjacent to, the forward end portion of the lower end surface of the die head.

16. The apparatus of claim 15 wherein the gas stream jetting holes extend nearly vertically.

17. The apparatus of claim 13 wherein the gas stream jetting holes are disposed in spaced-apart relationship in the width direction of the die head.

18. The apparatus of claim 13 wherein the gas stream jetting holes are in the form of an elongate slit.

19. A compression molding apparatus comprising
a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;

a material feed means for feeding a plastic material to said molding die means in said material charging means; and an article carrying means for carrying the molded article from the molding die means in said article discharging zone, wherein the material feed means includes an extruding means for extruding a molten plastic material through an extrusion opening, a cutting means for cutting the plastic material extruded through the extrusion opening and dropping it toward the molding die means, and a feed hampering means for selectively hampering the feeding of the plastic material to the molding die means; and the feed hampering means includes a receiving member mounted for free movement between an operating position located in a path of dropping of the plastic material toward the molding die means and a non-operating position spaced from the dropping path, and a positioning means for selectively holding the receiving member at the operating position and the non-operating position.

20. The apparatus of claim 19 wherein the feed hampering means further includes a resin reservoir tank, and when the receiving member is held at the operating position, the plastic material dropped onto the receiving member is sent to the resin reservoir tank from there.

21. The apparatus of claim 20 wherein the resin reservoir tank holds water therein.

22. The apparatus of claim 21 wherein a passage means is disposed between the receiving member and the resin reservoir tank so that the plastic material dropped onto the receiving member is sent to the resin reservoir tank through the passage means.

23. The apparatus of claim 22 wherein a gas stream jetting means for jetting gas streams which force the plastic material dropped onto the receiving member to one end portion of the receiving member and carry it to the inlet of the passage means is annexed to the receiving member.

24. The apparatus of claim 22 wherein a water stream is formed in the passage means flowing from its inlet to its outlet, and the plastic material is carried on the water stream.

25. A compression molding apparatus comprising a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;

a material feed means for feeding a plastic material to said molding die means in said material charging means; and an article carrying means for carrying the molded article from the molding die means in said article discharging zone, wherein the material feed means includes an extruding means for extruding a molten plastic material through an extrusion opening and cutting means for cutting the plastic material extruded through the extrusion opening and feeding it to the molding die means;

the cutting means includes a rotating cutting blade mounted so as to rotate across the extrusion opening, a driving source and a drivingly connecting means for drivingly connecting the driving source to the rotating cutting blade;

the drivingly connecting means includes at least one rotating angular position adjusting mechanism which permits the relatively angular position of its input shaft and output shaft to be adjusted freely; and the rotating angular position adjusting mechanism comprises an input gear fixed to the input shaft, an output gear fixed to the output shaft, a rotatable internal gear of a relatively large diameter surrounding the input and output gears, a rotatable input side power transmission gear in mesh with the input gear and the internal gear, a rotatable output side power transmission gear in mesh with the output gear and the internal gear, and a changing mechanism for changing the angular position of at least one of the input side power transmission gear and the output side power transmission gear around the input gear or the output gear.

26. The apparatus of claim 25 wherein the driving source of the rotary compression molding means and the driving source of the cutting means in the material feed means is comprised of a common single driving source.

27. A compression molding apparatus comprising a rotary compression molding means including a rotating supporting member mounted rotatably about its central axis, a plurality of molding die means mounted on said rotating supporting member at circumferentially spaced intervals, each of said molding die means having an upper die assembly and a lower die assembly cooperating with each other, at least one of the upper die assemblies and one of the lower die assemblies being freely movable with respect to the other, a driving source for rotating said rotating supporting member in a predetermined direction and moving said molding die means through a circular conveying passage including a material charging zone, a molding zone, a cooling zone and an article discharging zone located successively, and a die opening-closing means for moving at least one of said upper and lower die assemblies in a predetermined manner with respect to the other according to the movement of said molding die means;

a material feed means for feeding a plastic material to said molding die means in said material charging means; and an article carrying means for carrying the molded article from the molding die means in said article discharging zone, wherein the material feed means includes an extruding means for extruding a molten plastic material through an extrusion opening and cutting means for cutting the plastic material extruded through the extrusion opening and feeding it to the molding die means;

the extruding means includes a die head having a flow passage extending from the inlet of an extruder to the extrusion opening existing on its surface and a conduit means for connecting the outlet of the extruder to the inlet of the die head;

the cutting means includes a rotating shaft extending from behind the die head forwardly beyond the surface of the die head on which the extrusion opening exists, a rotating cutting blade mounted in the forward end portion of the rotating shaft and disposed on said surface of the die head, a driving source and a drivingly connecting means for drivingly connecting the driving source to the rotating shaft; and at least the die head in the extruding means and at least the rotating shaft and the rotating cutting blade in the cutting means are mounted on a slidable supporting frame, and the supporting frame is provided for free sliding between an operating position at which the die head and the rotating cutting blade are positioned in the material charging zone and a non-operating position at which they are retracted from the operating position.

28. The apparatus of claim 27 which further comprises a fluid pressure cylinder mechanism for sliding the supporting frame.

29. The apparatus of claim 27 wherein the extruder in the extruding means is held stationary at a predetermined position, and the conduit means in the extruding means includes at least two articulated joints.

30. The apparatus of claim 29 wherein the conduit means includes a first and a second rigid conduit members, the upstream end of the first conduit member is connected to the outlet of the extruder through an articulated joint, the downstream end of the first conduit member is connected to the upstream end of the second conduit member through another articulated joint, and the downstream end of the second conduit member is connected to the inlet of the die head through still another articulated joint.

31. The apparatus of claim 27 wherein the plastic material extruded from the extrusion opening of the die head is cut by the rotating blade and dropped; and the supporting frame has further mounted thereon a receiving member which is freely movable between an operating position located in a path of dropping of the plastic material and a non-operating position placed away from the path of dropping, and a positioning means for selectively holding the receiving member at the operating position and the non-operating position.

* * * * *